United States Patent
Yamada et al.

[11] Patent Number: 6,141,483
[45] Date of Patent: Oct. 31, 2000

[54] RECORDING MEDIUM FOR RECORDING DATA, REPRODUCING APPARATUS FOR REPRODUCING DATA RECORDED ON RECORDING MEDIUM, AND DATA REPRODUCING SYSTEM FOR REPRODUCING DATA RECORDED ON RECORDING MEDIUM VIA NETWORK OR THE LIKE

[75] Inventors: Hisashi Yamada, Yokohama; Hideo Ando, Tokyo, both of Japan

[73] Assignee: Kabushiki Kaisha Toshiba, Kawasaki, Japan

[21] Appl. No.: 08/998,940

[22] Filed: Dec. 29, 1997

[30] Foreign Application Priority Data

Dec. 26, 1996 [JP] Japan .................................... 8-348952
Aug. 6, 1997 [JP] Japan .................................... 9-211980

[51] Int. Cl.⁷ .......................... H04N 5/91; H04N 7/00
[52] U.S. Cl. ........................... 386/46; 386/95; 360/27
[58] Field of Search ................... 386/1, 45, 69, 386/70, 94, 95, 125, 126, 97, 46, 121; 360/60, 27; 380/3, 5, 22, 23; 345/507, 509; 455/12.1

[56] References Cited

U.S. PATENT DOCUMENTS

| | | | |
|---|---|---|---|
| 5,191,611 | 3/1993 | Lang | 380/5 |
| 5,214,556 | 5/1993 | Kilbel | 360/27 |
| 5,481,592 | 1/1996 | Azer | 455/12.1 |
| 5,671,320 | 9/1997 | Cookson et al. | 386/97 |
| 5,786,955 | 7/1998 | Kori et al. | 386/121 |
| 5,857,059 | 1/1999 | Yamagishi | 386/125 |
| 5,862,299 | 1/1999 | Lee et al. | 386/95 |

FOREIGN PATENT DOCUMENTS

| | | |
|---|---|---|
| 0 668 695 A2 | 2/1995 | European Pat. Off. . |
| WO 95/12283 | 5/1995 | WIPO . |
| WO 95/26028 | 9/1995 | WIPO . |

*Primary Examiner*—Wendy Garber
*Assistant Examiner*—Christopher Onuaku
*Attorney, Agent, or Firm*—Pillsbury Madison & Sutro LLP

[57] ABSTRACT

According to this invention, in reproducing data recorded on a recording medium, reproduction of the data is limited on the basis of the distribution order, regional limitations such as different principles, different values, and regulation of morals, and time limitations which are recorded on the recording medium. Accordingly, when data recorded on a recording medium is reproduced, reproduction of the data can be limited based on limitations recorded on the recording medium.

1 Claim, 20 Drawing Sheets

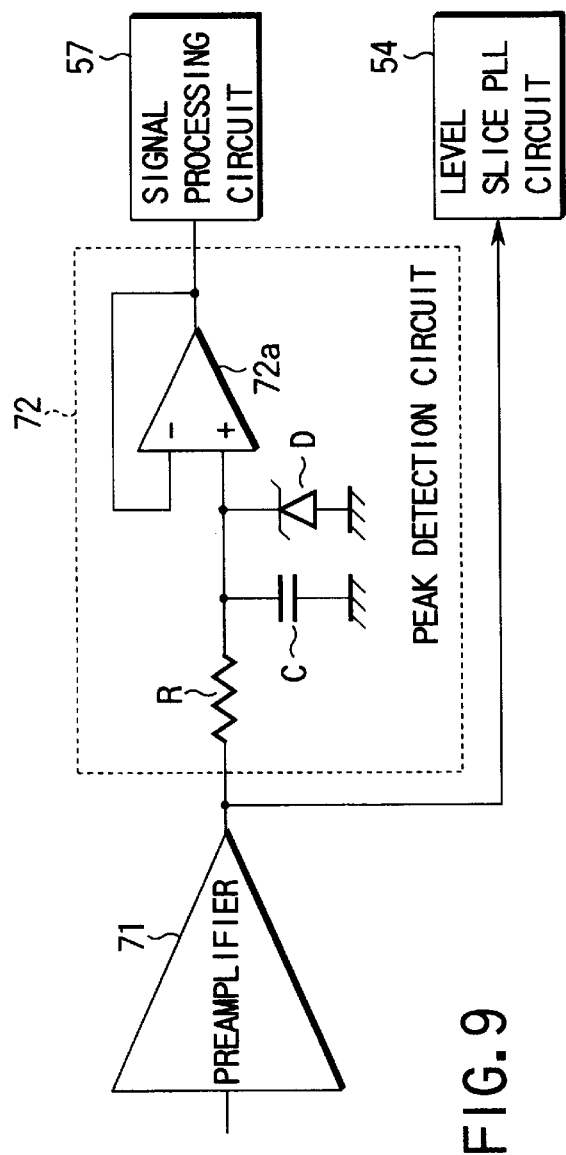

| A | B | C | F | G |
|---|---|---|---|---|
| REGION CODE ADDED TO DATA REPRODUCING APPARATUS ITSELF | LATEST TIME WHEN REGION CODE IS SET (OR UPDATED) IN RECORDING UNIT | CURRENT DATE | PERMISSION/NON-PERMISSION DATA ABOUT UPDATE OF REGION CODE | PERIOD UNTIL RE-UPDATE IS PERMITTED UPON UPDATING REGION CODE |

| NO. OF RECORDING MEDIUM IN USE | REGION CODE | | | | | | RECORDING MEDIUM USE FLAG | MANUFACTURING DATE OF RECORDING MEDIUM |
|---|---|---|---|---|---|---|---|---|
| | 1 | 2 | 3 | 4 | 5 | 6 | | |
| 1 | 1 | 1 | 0 | 0 | 0 | 0 | 1 | 11/1/1996 |
| 2 | 1 | 0 | 1 | 0 | 0 | 0 | 1 | 3/4/1998 |
| 3 | 0 | 0 | 0 | 0 | 1 | 0 | 1 | 12/30/1996 |
| 4 | 0 | 1 | 0 | 1 | 0 | 0 | 1 | 4/16/1997 |
| 5 | 0 | 1 | 1 | 0 | 0 | 0 | 1 | 7/25/1998 |
| 6 | | | | | | | | |
| 7 | | | | | | | | |
| 8 | | | | | | | | |
| 9 | | | | | | | | |
| 10 | | | | | | | | |
| 11 | | | | | | | | |
| TOTAL VALUE | 2 | 3 | 2 | 1 | 1 | 0 | 5 | |

FIG. 21

| NO. OF RECORDING MEDIUM IN USE | REGION CODE | | | | | | RECORDING MEDIUM USE FLAG | MANUFACTURING DATE OF RECORDING MEDIUM |
|---|---|---|---|---|---|---|---|---|
| | 1 | 2 | 3 | 4 | 5 | 6 | | |
| 1 | 1 | 1 | 0 | 0 | 0 | 0 | 1 | 11/1/1996 |
| 2 | 1 | 0 | 1 | 0 | 0 | 0 | 1 | 3/4/1998 |
| 3 | 0 | 0 | 0 | 0 | 1 | 0 | 1 | 12/30/1996 |
| 4 | 0 | 1 | 0 | 1 | 0 | 0 | 1 | 4/16/1997 |
| 5 | 0 | 1 | 1 | 0 | 0 | 0 | 1 | 7/25/1998 |
| 6 | 1 | 1 | 0 | 0 | 0 | 1 | 1 | 4/12/1997 |
| 7 | 0 | 0 | 0 | 0 | 0 | 0 | 1 | 11/2/1997 |
| 8 | 0 | 1 | 1 | 0 | 0 | 0 | 1 | 10/31/1996 |
| 9 | 0 | 1 | 0 | 0 | 1 | 0 | 1 | 2/4/1997 |
| 10 | 0 | 0 | 0 | 1 | 0 | 0 | 1 | 1/6/1998 |
| 11 | 0 | 1 | 1 | 0 | 1 | 0 | 1 | 3/2/1997 |
| TOTAL VALUE | 3 | 7 | 4 | 2 | 3 | 1 | 11 | |

FIG. 22

| NO. OF RECORDING MEDIUM IN USE | REGION CODE | | | | | | RECORDING MEDIUM USE FLAG | MANUFACTURING DATE OF RECORDING MEDIUM |
|---|---|---|---|---|---|---|---|---|
| | 1 | 2 | 3 | 4 | 5 | 6 | | |
| 1 | 0 | 0 | 1 | 0 | 0 | 0 | 1 | 2/4/1997 |
| 2 | 0 | 0 | 0 | 0 | 0 | 1 | 1 | 7/31/1998 |
| 3 | 0 | 0 | 1 | 0 | 0 | 0 | 1 | 2/4/1997 |
| 4 | 0 | 0 | 0 | 0 | 0 | 1 | 1 | 7/31/1998 |
| 5 | 0 | 0 | 1 | 0 | 0 | 0 | 1 | 2/4/1997 |
| 6 | 0 | 0 | 0 | 0 | 0 | 1 | 1 | 7/31/1998 |
| 7 | 0 | 0 | 1 | 0 | 0 | 0 | 1 | 2/4/1997 |
| 8 | 0 | 0 | 0 | 0 | 0 | 1 | 1 | 7/31/1998 |
| 9 | 0 | 0 | 1 | 0 | 0 | 0 | 1 | 2/4/1997 |
| 10 | 0 | 0 | 0 | 0 | 0 | 1 | 1 | 7/31/1998 |
| TOTAL VALUE | 0 | 0 | 5 | 0 | 0 | 5 | 10 | |

FIG. 23

| NO. OF RECORDING MEDIUM IN USE | REGION CODE | | | | | | RECORDING MEDIUM USE FLAG | MANUFACTURING DATE OF RECORDING MEDIUM |
|---|---|---|---|---|---|---|---|---|
| | 1 | 2 | 3 | 4 | 5 | 6 | | |
| 1 | 0 | 0 | 1 | 0 | 0 | 0 | 1 | 2/4/1997 |
| 2 | 0 | 0 | 0 | 0 | 0 | 1 | 1 | 7/31/1998 |
| 3 | 0 | 0 | 1 | 0 | 0 | 0 | 1 | 2/4/1997 |
| 4 | 0 | 0 | 0 | 0 | 0 | 1 | 1 | 7/31/1998 |
| 5 | 0 | 0 | 1 | 0 | 0 | 0 | 1 | 2/4/1997 |
| 6 | 0 | 0 | 0 | 0 | 0 | 1 | 1 | 7/31/1998 |
| 7 | 0 | 0 | 1 | 0 | 0 | 0 | 1 | 2/4/1997 |
| 8 | 0 | 0 | 0 | 0 | 0 | 1 | 1 | 7/31/1998 |
| 9 | 0 | 0 | 1 | 0 | 0 | 0 | 1 | 2/4/1997 |
| 10 | 0 | 0 | 0 | 0 | 0 | 1 | 1 | 7/31/1998 |
| 11 | 0 | 0 | 1 | 0 | 0 | 0 | 1 | 8/1/1988 |
| TOTAL VALUE | 0 | 0 | 6 | 0 | 0 | 5 | 11 | |

FIG. 24

RECORDING MEDIUM FOR RECORDING DATA, REPRODUCING APPARATUS FOR REPRODUCING DATA RECORDED ON RECORDING MEDIUM, AND DATA REPRODUCING SYSTEM FOR REPRODUCING DATA RECORDED ON RECORDING MEDIUM VIA NETWORK OR THE LIKE

BACKGROUND OF THE INVENTION

The present invention relates to a recording medium on which data is recorded, a reproducing apparatus for reproducing the data recorded on the recording medium, and a reproducing system for reproducing the data recorded on the recording medium via a network or the like.

In recent years, various types of recording media represented by, e.g., a tape, a disk, and a semiconductor memory have been developed and are commercially available. In these recording media, data can be reproduced without any regional limitations or the like.

There is a need for a recording medium from which data can be reproduced in the distribution order prepared by dividing the world into a plurality of regions when a movie or the like is recorded on the recording medium.

In addition, there is also a need for a recording medium in which reproduction of a recorded image can be regionally limited because of different principles, different values, and regulation of morals among the different regions.

BRIEF SUMMARY OF THE INVENTION

It is an object of the present invention to provide a recording medium having regional limitations.

It is another object of the present invention to provide a recording medium in which the period of time during which recorded reproduction data may be reproduced can be regionally changed.

It is still another object of the present invention to provide a recording medium in which the period of time during which a movie may be reproduced as recorded reproduction data can be regionally changed in the distribution order.

It is still another object of the present invention to provide a recording medium having regional limitations regardless of the standard television scheme.

It is still another object of the present invention to provide a recording medium having regional limitations corresponding to different principles.

It is still another object of the present invention to provide a recording medium having regional limitations corresponding to different values.

It is still another object of the present invention to provide a recording medium having regional limitations corresponding to different languages.

It is still another object of the present invention to regionally limit reproduction of reproduction data recorded on the recording medium.

It is still another object of the present invention to regionally change the reproducible time in reproducing reproduction data recorded on the recording medium.

It is still another object of the present invention to regionally change the reproducible time in the distribution order in reproducing a movie as reproduction data recorded on the recording medium.

It is still another object of the present invention to set regional limitations regardless of the standard television scheme in reproducing reproduction data recorded on the recording medium.

It is still another object of the present invention to set regional limitations corresponding to different principles in reproducing reproduction data recorded on the recording medium.

It is still another object of the present invention to set regional limitations corresponding to different values in reproducing reproduction data recorded on the recording medium.

It is still another object of the present invention to set regional limitations corresponding to different languages in reproducing reproduction data recorded on the recording medium.

It is still another object of the present invention to allow reproduction of reproduction data when a predetermined period has elapsed upon forming the reproduction data even if a medium region code recorded on the recording medium does not coincide with the apparatus region code of the reproducing apparatus in reproducing the reproduction data recorded on the recording medium.

It is still another object of the present invention to allow reproduction of reproduction data when specific data recorded on the recording medium coincides with specific data set even if a medium region code recorded on the recording medium does not coincide with the apparatus region code of the reproducing apparatus in reproducing the reproduction data recorded on the recording medium.

It is still another object of the present invention to stably provide data services meeting various requests only when specific conditions are satisfied even if region codes do not coincide with each other in the initial stage.

To achieve the above object, the present invention provides a disk array apparatus comprising a recording medium from which data is reproduced in a reproducing apparatus capable of reproduction, comprising:

reproduction data to be reproduced in the reproducing apparatus; and a medium region code for controlling in each of a plurality of regions whether the reproduction data can be reproduced.

The present invention also provides a recording medium from which data is reproduced in a reproducing apparatus capable of reproduction, comprising:

reproduction data to be reproduced in the reproducing apparatus; and a medium region code for controlling whether the reproduction data can be reproduced, in units of regions regardless of a standard television scheme.

The present invention further provides a recording medium from which data is reproduced in a reproducing apparatus capable of reproduction, comprising:

reproduction data to be reproduced in the reproducing apparatus; and a medium region code for controlling whether the reproduction data can be reproduced, in units of regions having different principles.

The present invention further provides a recording medium from which data is reproduced in a reproducing apparatus capable of reproduction, comprising:

reproduction data to be reproduced in the reproducing apparatus; and a medium region code for controlling whether the reproduction data can be reproduced, in units of regions having different values.

The present invention further provides a recording medium from which data is reproduced in a reproducing apparatus capable of reproduction, comprising:

reproduction data to be reproduced in the reproducing apparatus; and a medium region code for controlling whether the reproduction data can be reproduced, in units of regions having different languages.

The present invention further provides a recording medium from which data is reproduced in a reproducing apparatus capable of reproduction, comprising:

reproduction data to be reproduced in the reproducing apparatus; and a formation date of the reproduction data, a medium region code for controlling in units of regions whether the reproduction data can be reproduced, a time permission condition which is not limited by the medium region code and is the number of months after the formation date, and specific data not limited by the medium region code.

The present invention further provides a reproducing apparatus which can reproduce data from a recording medium, and reproduces data from the recording medium having reproduction data to be reproduced, and a medium region code for controlling in units of regions whether the reproduction data can be reproduced, comprising:

recording means for recording an apparatus region code of each selling region of the reproducing apparatus;

first reproducing means for reproducing the medium region code from the recording means;

determining means for comparing the medium region code reproduced by the first reproducing means with the apparatus region code of the recording means to determine whether the reproduction data recorded on the recording medium can be reproduced; and second reproducing means for reproducing the reproduction data from the recording medium when the determining means determines that the reproduction data recorded on the recording medium can be reproduced.

The present invention further provides a reproducing apparatus which can reproduce data from a recording medium, and reproduces data from the recording medium having reproduction data to be reproduced, a formation date of the reproduction data, a medium region code for controlling in units of regions whether the reproduction data can be reproduced, a time permission condition which is not limited by the medium region code and is the number of months after the formation date, and specific data not limited by the medium region code, comprising:

recording means for recording an apparatus region code of each selling region of the reproducing apparatus;

first determining means for determining a current date;

setting means for setting specific data;

first reproducing means for reproducing the medium region code from the recording means;

second determining means for comparing the medium region code reproduced by the first reproducing means with the apparatus region code of the recording means to determine whether the reproduction data recorded on the recording medium can be reproduced;

second reproducing means for reproducing the reproduction data from the recording medium when the second determining means determines that the reproduction data recorded on the recording medium can be reproduced;

third determining means for determining whether the reproduction data recorded on the recording medium can be reproduced, on the basis of the time permission condition as the number of months after the formation date and the current date determined by the first determining means when the second determining means determines that the reproduction data recorded on the recording medium cannot be reproduced;

third reproducing means for reproducing the reproduction data from the recording medium when the third determining means determines that the reproduction data recorded on the recording medium can be reproduced;

fourth determining means for determining whether the reproduction data recorded on the recording medium can be reproduced, on the basis of the specific data recorded on the recording medium and the specific data st by the setting means when the second determining means determines that the reproduction data recorded on the recording medium cannot be reproduced; and fourth reproducing means for reproducing the reproduction data from the recording medium when the fourth determining means determines that the reproduction data recorded on the recording medium can be reproduced.

The present invention further provides a data reproducing system comprising:

a first recording unit on which at least transferable data is recorded;

a second recording unit on which changeable data is recorded;

output means for outputting at least part of the transferable data recorded on the first recording unit; and a control unit for controlling data transfer from the first recording unit to the output means or data transfer from the first recording unit to the second recording unit, the control unit controlling transfer of the transferable data recorded on the first recording unit on the basis of a comparison result between data recorded on the first recording unit and data recorded on the second recording unit, wherein the control unit compares a content of first data recorded on the first recording unit with a content of second data recorded on the second recording unit to control data transfer, third data having a content different from the contents of the first and second data is recorded on either one of the first and second recording units, and the control unit changes, on the basis of the third data, a control condition for controlling data transfer in accordance with the comparison result between the first and second data.

The present invention further provides a data reproducing system comprising:

a first recording unit on which at least transferable data is recorded;

a second recording unit on which changeable data is recorded;

output means for outputting at least part of the transferable data recorded on the first recording unit; and a control unit for controlling data transfer from the first recording unit to the output means or data transfer from the first recording unit to the second recording unit, the control unit controlling transfer of the transferable data recorded on the first recording unit on the basis of a comparison result between data recorded on the first recording unit and data recorded on the second recording unit, wherein at least the data recorded on the first or second recording unit is changed via the control unit on the basis of a content of at least one of data recorded on the first recording unit and data recorded on the second recording unit.

The present invention further provides a data reproducing apparatus capable of reproducing data from a recording medium on which data is recorded, comprising:

a data read unit for reading data from the recording medium;

a control unit for controlling transfer of the data read by the data read unit; and a recording unit for recording rewritable data, wherein the data read from the recording medium is compared with the data recorded on the recording unit, and the data recorded on the recording unit can be updated on the basis of a comparison result.

The present invention further provides a recording medium from which data can be optically reproduced by a data reproducing apparatus, comprising:

at least any one of region data, time data, and data about transfer control of data, at least any one of the region data, the time data, and the data about transfer control of data being recorded in a form of a microstructure on a recording surface.

The present invention further provides a data reproducing apparatus capable of reproducing data from a recording medium on which data is recorded, comprising:

a data read unit for reading data from the recording medium;

a control unit for controlling transfer of the data read by the data read unit; and a recording unit for recording at least part of the data read from the recording medium, wherein at least part of data read from a plurality of recording medium are separately recorded on the recording unit, second data is generated using first data recorded, and the control unit controls data transfer on the basis of the second data.

The present invention further provides a data reproducing apparatus for reproducing data from a recording medium on which data, and a valid time of copyright use of the data are recorded, comprising:

a data read unit for reading the data and the valid time of copyright use of the data from the recording medium;

determining means for comparing the valid time of copyright use ready by the data read unit with a current date to determine whether reproduction of the data is permitted; and a control unit for controlling transfer of the data read by the data read unit when the determining means determines to permit reproduction of the data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a circuit diagram showing the arrangement of the RF amplifier in FIG. 2;

FIGS. 10, 13, and 16 are views each showing a recording example of determination data for determining permission of data services in the recording unit 12 of FIG. 1;

FIGS. 21 to 24 are tables, respectively, for explaining the history contents of the region code of each recording medium recorded on the recording unit of the data reproducing apparatus;

DETAILED DESCRIPTION OF THE INVENTION

An embodiment of the present invention will be described below with reference to the several views of the accompanying drawing.

Figure 1:
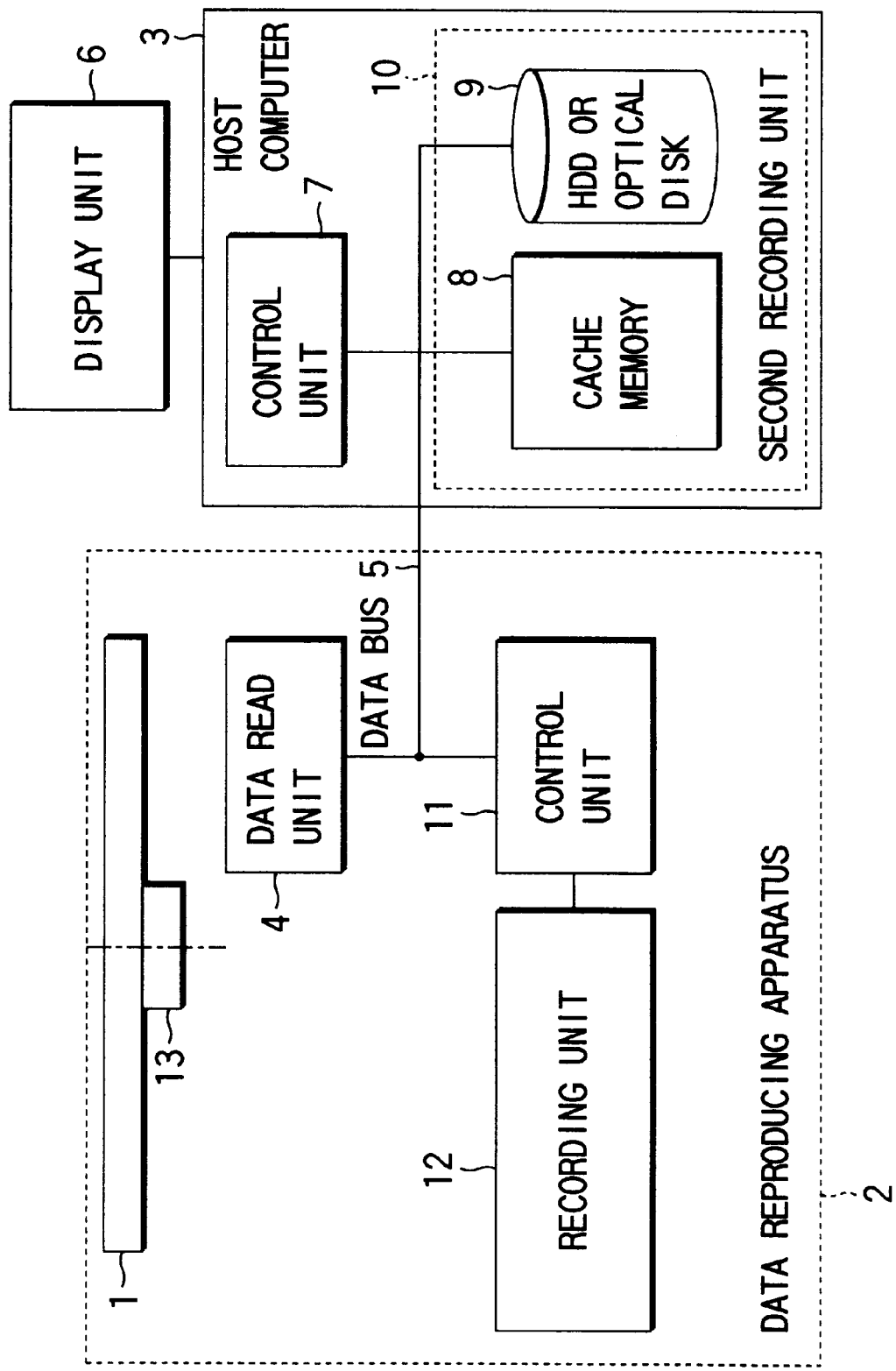
FIGS. 1 and 2 are block diagrams, respectively, for explaining the schematic configuration of a data reproducing system using a recording medium.

FIG. 1 is a schematic explanatory view showing a data reproducing system according to an embodiment of the present invention.

In this embodiment, the data provider side is a recording medium 1 as a package medium such as a CD, a DVD video, a DVD-ROM, a DVD-R, or a DVD-RAM and is the first recording unit.

The data receiver side is a system constituted by a data reproducing apparatus 2 and a host computer 3. Data recorded on the recording medium 1 is read by a data read unit 4, sent to the host computer 3 via a data bus 5, and displayed on a display unit 6 such as a CRT or a liquid crystal/plasma display.

The host computer 3 comprises a control unit 7, and a second recording unit 10 constituted by a cache memory 8 made up of a RAM and an EEPROM and an HDD or optical disk 9. In some cases, data sent via the data bus 5 is directly recorded on the HDD or optical disk 9 or the cache memory 8 without being displayed on the display unit 6.

The data reproducing apparatus 2 incorporates a control unit 11, and controls transfer of data read by the data read unit 4 to the host computer 3. The control unit 11 has a recording unit 12 serving as a second recording unit made up of a nonvolatile recording element such as an EEPROM. If necessary, data recorded on the recording unit 12 is read by the control unit 11, and reflected on transfer control.

The recording medium 1 is rotated by a disk motor 13.

Figure 2:
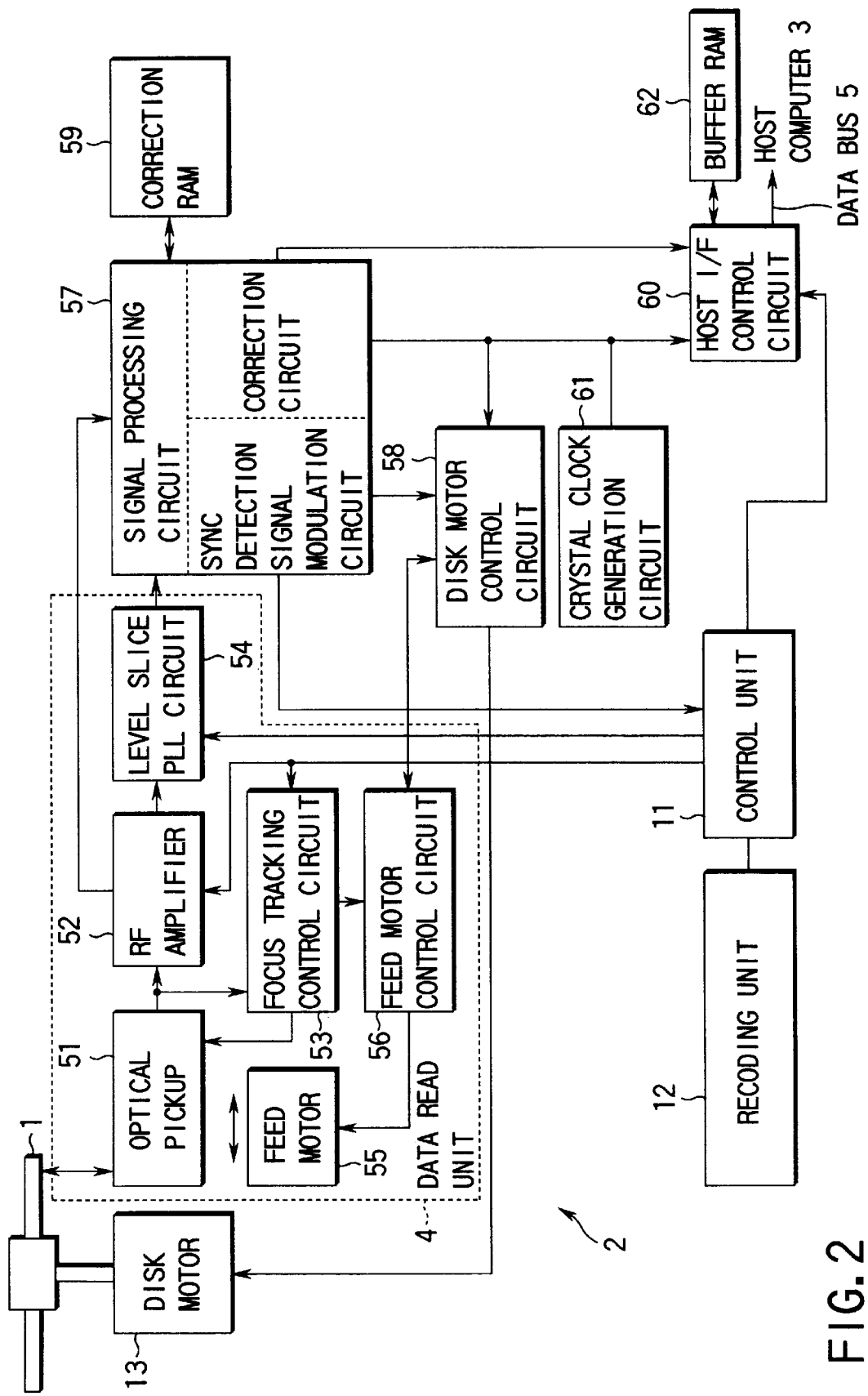

The data reproducing apparatus 2 shown in FIG. 2 reproduces data recorded on the recording medium 1 using convergent light.

Figure 3:
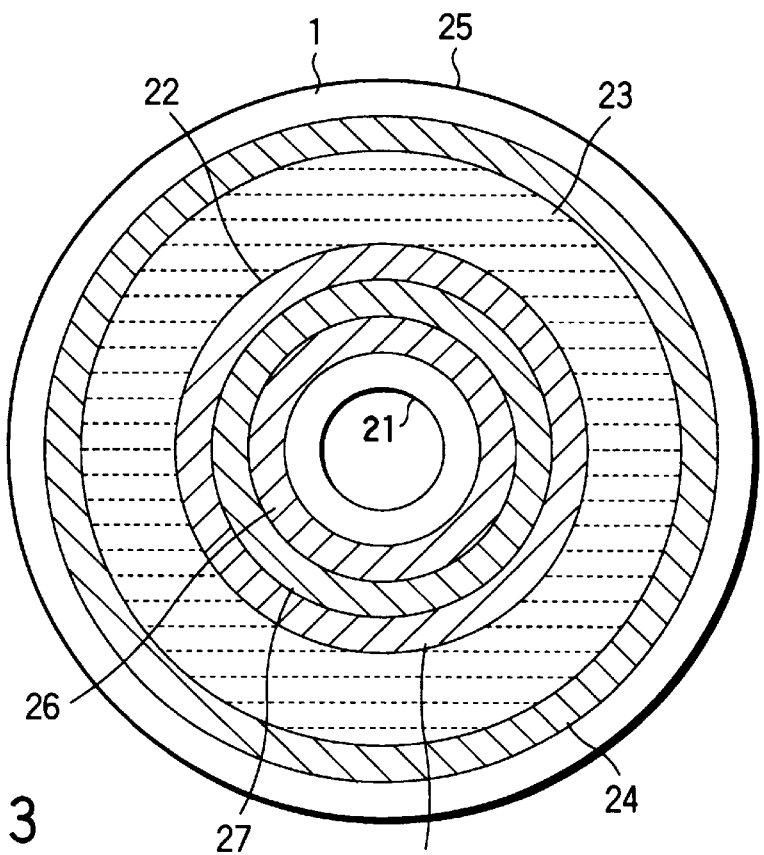
FIG. 3 is a plan view showing the schematic arrangement of the recording medium in FIG. 1.

FIG. 3 shows the structure of data contents recorded on a data area/rewritable data recording medium 1 that allows a data single write by the user. The recording medium 1 allows data reproduction by irradiating light on a recording layer via a transparent substrate (neither are shown).

An inner hole 21 for attaching the recording medium 1 on the data reproducing apparatus 2 and removing any eccentricity is defined by the innermost periphery of the recording medium 1.

The recording medium 1 has, in the order from the inner peripheral portion, a lead-in area 22, a data area/rewritable data zone 23, a lead-out area 24, and an outer peripheral edge 25 at the outermost periphery.

The data area/rewritable data zone 23 is made up of an area where data is recorded, and a data area/rewritable data zone.

The lead-in area 22 is made up of, in the order from the innermost peripheral side, a reference signal portion 26 where a reference code is recorded, a control data portion 27, and an erasable data portion 28. At the reference signal portion 26 and the control data portion 27, data are recorded in the form of microstructures in manufacture.

At the erasable data portion 28, data is recorded by the manufacturer upon manufacturing the recording medium 1. The erasable data portion 28 is made up of an authentication portion for each recording medium, a data description portion about a data alternation area, a test recording portion (none of which are shown in FIG. 3), and the like.

Data about manufacture such as the manufacturing date of a recording medium, a region code, and a user name or user organization name given a special permission are described at the control data portion 27. Physical format data about recording conditions such as the recording linear speed, reproduction power, recording power, and recording pulse width are also described at the control data portion 27.

The lead-out area 24 is made up of an authentication portion for each recording medium, a data description portion about a data alternation area, a test recording portion (none of which are shown in FIG. 2), and the like.

Figure 4:
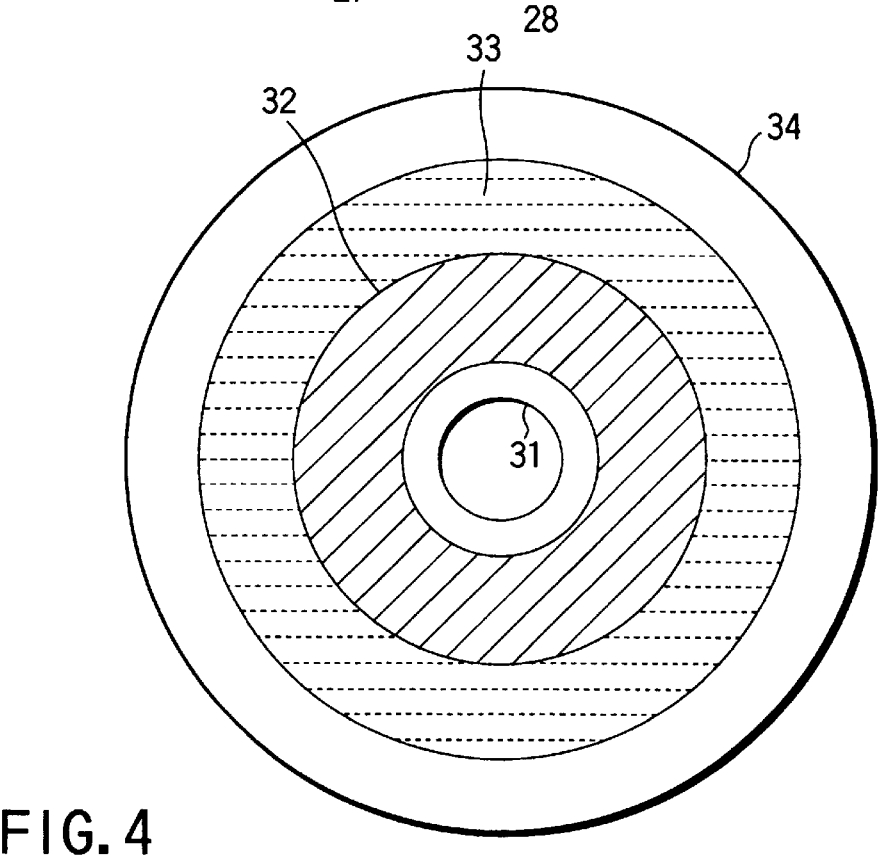
FIG. 4 is a plan view showing another schematic arrangement of the recording medium in FIG. 1.

FIG. 4 shows the structure of a read-only recording medium 1.

An inner hole 31 for attaching the recording medium 1 on the data reproducing apparatus 2 and removing any eccentricity is defined by the innermost periphery of the recording medium 1.

The recording medium 1 has, in the order from the inner peripheral portion, a lead-in area 32, a data area 33 where data to be supplied to the user is recorded, and an outer peripheral edge 34 at the outermost periphery.

Data recorded in the data area 33 is mainly transferred to the host computer 3 via the data bus 5 in FIG. 1.

In the lead-in area 32, a region code having regional data, the manufacturing date of a recording medium, transfer permission conditions having contents about data transfer control, and the like are recorded as data in manufacture (in advance), together with the reproduction linear speed and the reproduction power.

The transfer permission conditions change depending on each recording medium 1. Data about the elapsed period upon manufacture of a recording medium after which data transfer is permitted even for a data reproducing apparatus 2 having a different region code, designation of a special data reproducing apparatus 2 in order to permit data transfer for the data reproducing apparatus 2 having a different region code, or a special user name or special organization name and its password and ID number, and the like are described.

Detailed data contents in the lead-in area 22 on the read-only recording medium 1 will be explained with reference to FIGS. 5A and 6.

Figure 5:
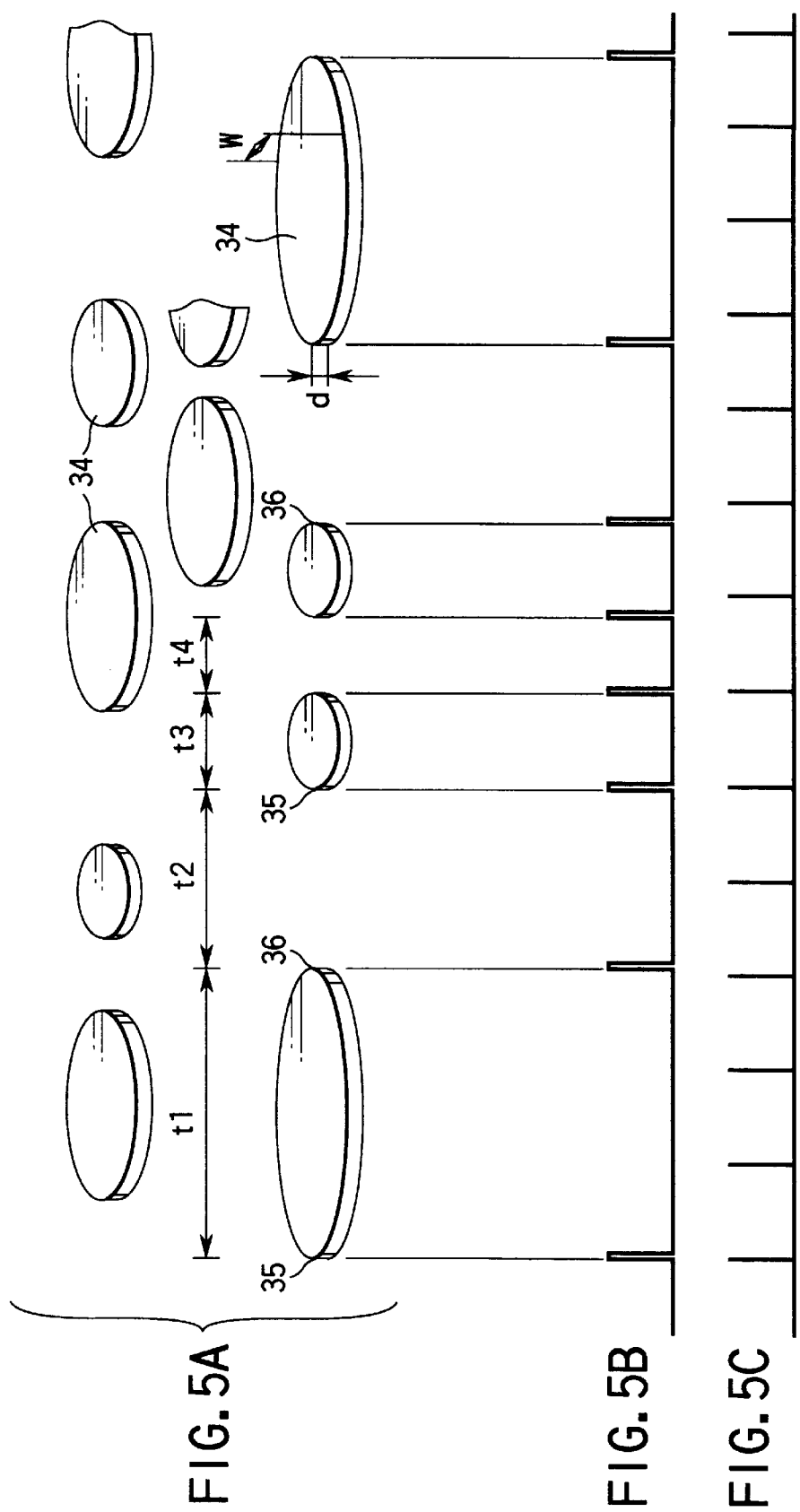
FIG. 5A is a view showing the physical structure on the recording surface in the lead-in area of the recording medium in FIG. 1.
FIG. 5B is a view for explaining detection signals of the pit start and end positions.
FIG. 5C is a view for explaining the channel bit interval based on a clock used in quantization.
Figure 6:
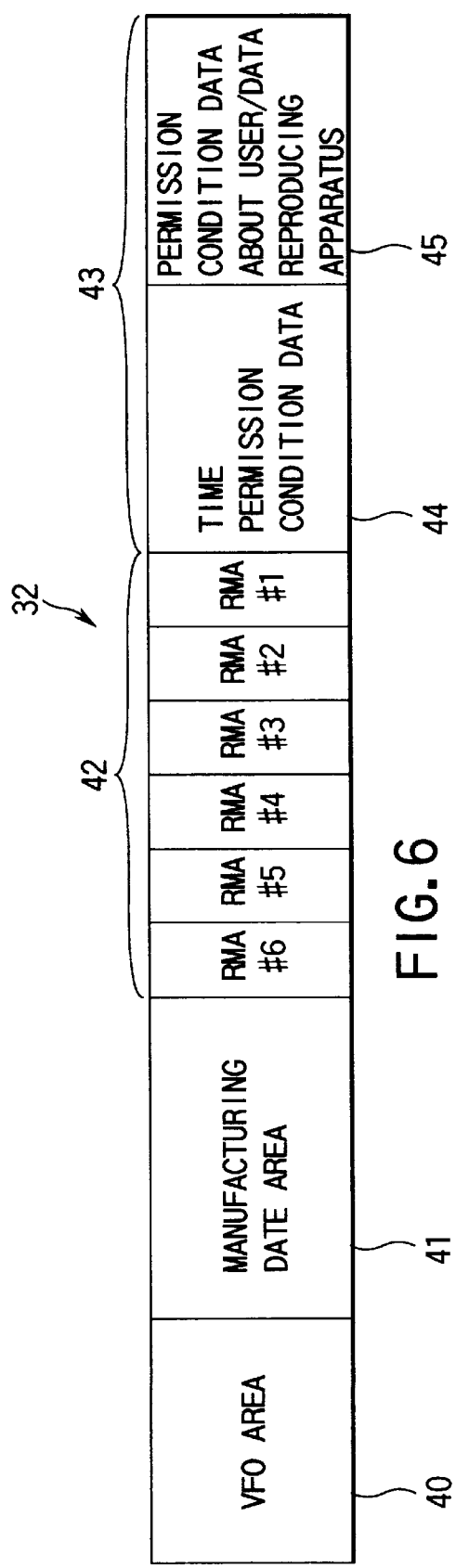
FIG. 6 is a view showing the detailed contents of part of data recorded in the lead-in area on the recording medium of FIG. 1.

Data contents in FIGS. 5A and 6 are the same as data contents in the control data portion 27 of the data area/rewritable data recording medium 1. The physical structure on the recording surface in the lead-in area 32 of the recording medium 1 has a microstructure pattern, as shown in FIG. 5A. When reproduction light passes through a microstructure area, interference occurs between light reflected by a flat base portion and light reflected by the bottom portion (or top portion) of a microstructural pit 34 to decrease the practical reflection light amount.

Using the change in practical reflection light amount, data is reproduced. Letting n be the refractive index of the transparent substrate of the recording medium 1, and $\lambda$ be the wavelength of reproduction light, a step amount d of the microstructural pit 34 must satisfy the following condition as a condition to obtain a change in practical reflection light amount $$0 < d < \lambda/(2n)$$

In general, the step amount d substantially falls within the range of $$\lambda/(8n) \leq d \leq 3\lambda/(8n)$$

Similarly, to change the effective reflection light amount, the microstructural pit 34 must have a width w which is smaller than the size of the spot which the reproduction light forms on the recording surface. (Here, the term "spot size" means a diameter of $1/e^2$, where 1 is the light intensity at the center of the spot.) Data is recorded by giving a meaning to the interval (t1, t2, t3, t4, or the like) between a pit start position 35 and a pit end position 36.

In reproduction, a position where the intensity of reproduction light changes is detected, and the pit start position 35 and the pit end position 36 are detected as shown in FIG. 5B. The interval between the start and end positions is quantized and extracted using, as a reference, the channel bit interval based on a clock shown in FIG. 5C. "1" is set at the quantized interval position to form a digital reproduction signal. Data recorded in the form of the microstructural pit 34 shown in FIG. 5A is recorded in advance in manufacturing the recording medium 1, and cannot be altered by the user.

The data recorded on the microstructural pit 34 is therefore very reliable data which cannot be altered.

FIG. 6 shows detailed contents of part of data in the lead-in area 32 that is recorded as shown in FIG. 5A. More specifically, as shown in FIG. 6, part of data in the lead-in area 32 is made up of a VFO area 40, a manufacturing date area 41, a region code area 42, and an area 43 where data about data transfer control is recorded.

At the start of the lead-in area 32, the VFO area 40 having data recorded in a specific pattern is set.

The disk motor 13 for rotating the recording medium 1 in FIG. 1 has rotation fluctuations. Accordingly, the time reference interval used in reading data by the data read unit 4 and quantizing the data at the channel bit interval slightly changes in accordance with the rotation fluctuations of the disk motor 13.

To eliminate the influence of the rotation fluctuations of the disk motor 13, before reading actual data, data of the VFO area 40 having pits formed at a specific interval is read, and the reference clock frequency in the data read unit 4 is adjusted (the frequency of the PLL circuit is locked).

A portion where data about the recording medium 1 is recorded is set after the VFO area 40 for adjusting the reference clock frequency in this manner.

As shown in FIG. 6, the lead-in area 32 has the manufacturing date area 41 where the manufacturing date representing the formation time of the master for the recording medium 1 is recorded as time data.

Next to the manufacturing date area 41, the lead-in area 32 has the region code area 42 about the region.

Figure 7:
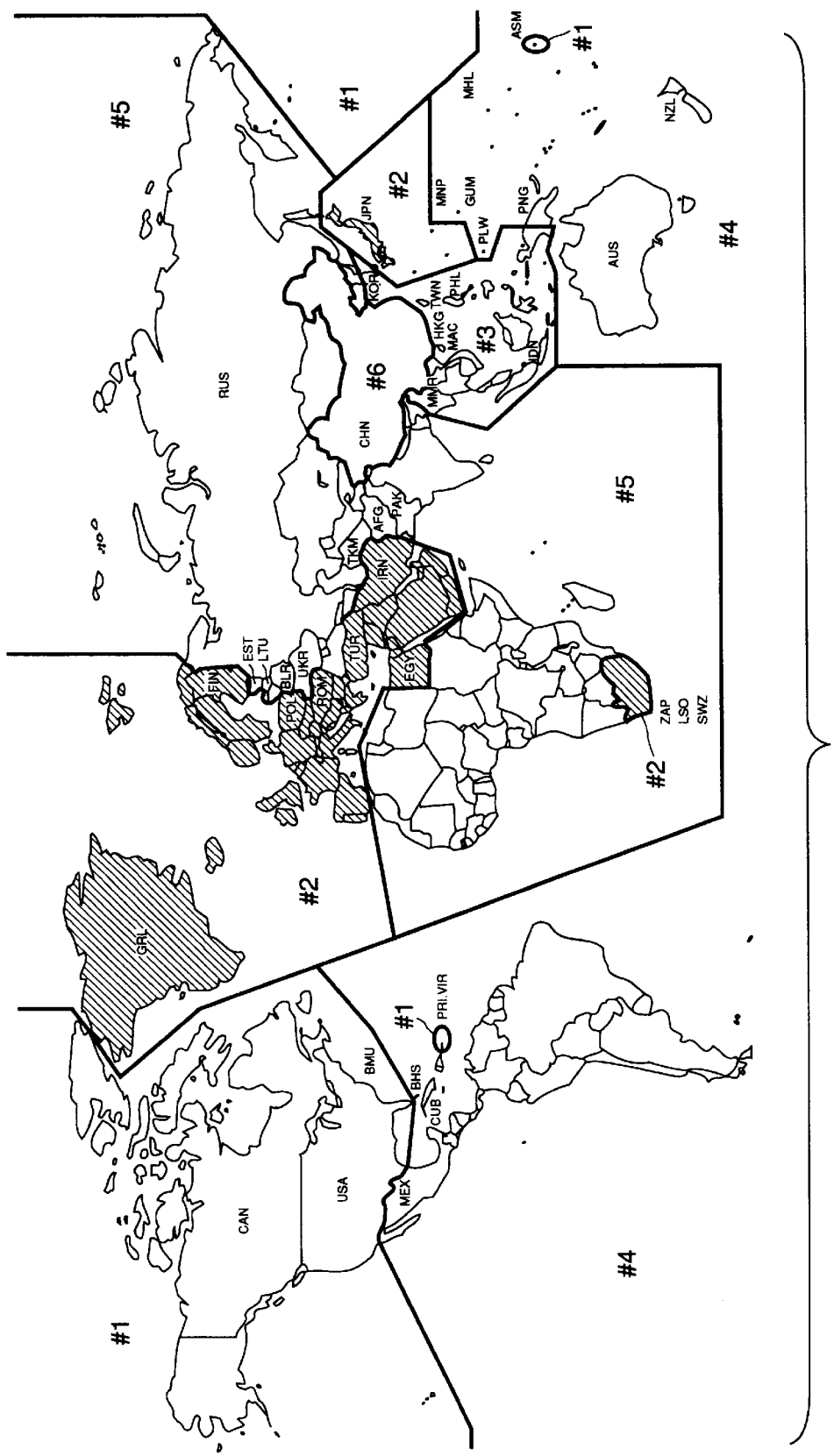
FIG. 7 is a view for explaining division of the world into regions using region codes.

As shown in FIG. 7, the world is divided into six regions as region data, and the respective regions are numbered #1 to #6. That is, the world is divided into regions having region codes: North America, Europe and Japan, Southeast Asia, Oceania and South America, Russia and Africa, and China. In correspondence with each region, a 6-bit code is set as a region code. In FIG. 6, if a value RMA#m (m=1 to 6) is "0", reproduction/transfer of data is permitted in this region; if "1", reproduction/transfer of data is not permitted in this region.

By setting a plurality of values RMA#m (m=1 to 6) to "0", data can be reproduced/transferred in the plurality of regions on the world.

Region #1 is the English-speaking zone such as the United States of America and Canada using the NTSC system; region #2, Europe such as Britain and France, the Middle East such as Jordan using the PAL system, and Japan using the NTSC system; region #3, Southeast Asia such as Brunei and Cambodia; region #4, Oceania such as Australia, South America such as Mexico and Brazil, and Central and South America such as Bahamas; region #5, Africa except for Egypt and South Africa, the Soviet Union such as Russia, and part of Asia such as India and Pakistan; and region #6, China as the Communist bloc.

In this way, the recording medium 1 can have regional limitations by region codes for the six regions obtained by dividing the world.

Like region #2, the recording medium 1 can have regional limitations regardless of different standard television schemes, as indicated by Europe such as Britain and France and the Middle East such as Jordan having a PAL system, and Japan having an NTSC system.

By setting a separate region code for China as the Communist bloc, like region #6, the recording medium 1 can have regional limitations corresponding to different principles and different values.

The region numbers are ordered in accordance with the movie distribution order (release time).

Next to the region code area 42, the lead-in area 32 has the area 43 where data about data transfer control is recorded. As practical data, time permission condition data 44 is first recorded with values in units of months. When this value is "24", if two years (24 months) have elapsed upon manufacturing (the master of) the recording medium 1, reproduction of data and transfer of data to the host computer 3 are permitted even if the value of the region code area 42 in FIG. 6 does not coincide with the region code recorded on the recording unit 12 in FIG. 1.

Permission condition data 45 about the user/data reproducing apparatus is recorded next. In this area, conditions for permitting reproduction/transfer of data for a specific data reproducing apparatus 2 or a user or organization having a coincident password or ID number, even if region codes do not coincide with each other, are recorded.

As shown in FIG. 2, recorded data is read from the recording medium 1 by an optical pickup 51. A signal read by the optical pickup 51 is supplied to an RF (Radio Frequency) amplifier 52 and a focus tracking control circuit 53. The RF amplifier 52 amplifies the signal output from the optical pickup 51, and outputs the RF signal to a level slice PLL (Phase Locked Loop) circuit 54.

Based on the signal output from the optical pickup 51, the focus tracking control circuit 53 generates a focus error signal and a tracking error signal necessary for focus servo and tracking servo for an objective lens (not shown) incorporated in the optical pickup 51. Based on these focus error signals, the focus tracking control circuit 53 controls an actuator (not shown) for driving the objective lens in the focus and tracking directions.

The focus tracking control circuit 53 also controls the actuator in response to an instruction from the control unit 11 to control movement of a read track by a lens kick, and controls instantaneous movement to a target track within the range ±100 tracks.

The optical pickup 51 is moved by a feed motor 55 in the radial direction of the recording medium 1. The feed motor 55 is controlled by a feed motor control circuit 56 which receives the tracking error signal output from the focus tracking control circuit 53, a search instruction signal output from the control unit 11, and the like.

After binarizing the input RF signal, the level slice PLL circuit 54 generates 8/16-modulated data having 1 byte made of 16 bits, and generates a PLL clock in synchronism with the 16-bit data. The level slice PLL circuit 54 outputs the 16-bit data and the PLL clock to a signal processing circuit 57. The signal processing circuit 57 detects a periodic synchronous signal using the input PLL clock to generate a CLV (Constant Linear Velocity) control signal and to output it to a disk motor control circuit 58. On the basis of the input CLV control signal, the disk motor control circuit 58 controls the rotational speed of the disk motor 13 for rotating the recording medium 1.

Using the PLL clock, the signal processing circuit 57 demodulates the input 16-bit data into original data having 1 byte made of 8 bits. The signal processing circuit 57 writes the demodulated 8-bit data in a correction RAM 59 at the PLL clock to perform error correction. The signal processing circuit 57 transfers the data having undergone error correction to the host computer 3 via a host I/F control circuit 60.

The host I/F control circuit 60 controls communication with the host computer 3. A clock generation circuit 61 generates a clock having a reference frequency obtained by dividing an oscillation frequency from a crystal oscillator, and outputs the clock to the signal processing circuit 57, the disk motor control circuit 58, and the host I/F control circuit 60.

The operation of the optical disk device is integrally controlled by the control unit 11.

The data read unit 4 is constituted by the optical pickup 51, the RF amplifier 52, the focus tracking control circuit 53, the feed motor control circuit 56, the feed motor 55, and the level slice PLL circuit 54.

The optical pickup 51 has an IV conversion amplifier (not shown), and is made up of, e.g., TA1244FN.

The RF amplifier 52 is made up of TA1236F.

The focus tracking control circuit 53, the feed motor control circuit 56, and the disk motor control circuit 58 are constituted by TA1253FN and TC9420.

The level slice PLL circuit 54 and the signal processing circuit 57 are constituted by TC90A19F.

The correction RAM 59 is made up of TC514800A.

The control unit 11 is made up of TMP93CS42AF.

When the data read unit 4 reads the region code of the region code area 42 and the manufacturing date of the manufacturing date area 41 on the recording medium 1, the control unit 11 checks whether the data are recorded in the form of microstructures.

This is performed to prevent the user from recording a false region code and manufacturing date on the data area/rewritable data recording medium 1 such as a DVD-R or a DVD-RAM, and attempting illicit use (publication of a pirated edition) of the medium.

Figure 8A:
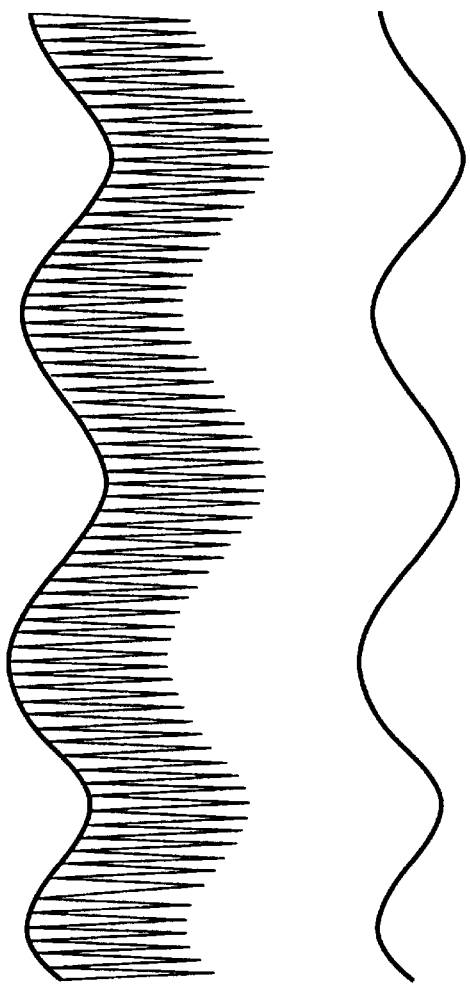
FIG. 8A is a view showing a raw signal upon reproducing data written in write-once successive grooves wobbling at a predetermined period.

In the data area/rewritable data recording medium 1 such as a DVD-R or a DVD-RAM, unlike recording in the form of microstructures, data are rewritten in successive grooves wobbling at a predetermined period. As shown in FIG. 8A, a raw signal obtained upon reproducing data written in write-once successive grooves wobbling at a predetermined period varies in reproduction signal level in accordance with the wobble of the successive grooves. A signal obtained from the rewritten data appears below the signal envelope.

A circuit for processing this signal is added to the RF amplifier 52 in FIG. 2, and the structure of the main part is shown in FIG. 9. A preamplifier 71 for amplifying a signal from the optical pickup 51 is arranged in the RF amplifier 52. A signal output from the preamplifier 71 is divided into two. One signal is supplied to the level slice PLL circuit 54, while the other is sent to a peak detection circuit 72 and then the signal processing circuit 57.

The peak detection circuit 72 is constituted by a resistor R, a capacitor C, a Zener diode D, and a comparator 72a.

Figure 8B:
FIG. 8B is a view showing a peak detection signal in a peak detection circuit within an RF amplifier of FIG. 2.

The peak detection circuit 72 removes the rewritten data signal shown in FIG. 8A to extract a signal obtained from only the wobbling successive grooves, as shown in FIG. 8B. The signal processing circuit 57 detects the amplitude and frequency of the signal varying at a predetermined period in FIG. 8B to determine the presence/absence of the wobbling successive grooves. When the reproduction signal does not have any signal component varying at a predetermined period like the one shown in FIG. 8B, recorded data about the region code and the manufacturing date of the recording medium 1 are regraded to be recorded in the form of microstructures on the recording surface of the recording medium 1.

A detailed function for the region code of the data reproducing apparatus 2 will be explained below with reference to FIG. 2.

As an embodiment wherein data services are provided even if region codes do not coincide with each other in the initial state, the following description exemplifies 1) a case wherein determination data for determining whether data services can be provided is recorded in advance in addition to the region code, and data services are provided using this data.

In this case, as shown in FIG. 10, the recording unit 12 has

A] a region code added to the data reproducing apparatus 2 itself,

B] the time when the region code is finally set (or updated) in the recording unit 12, C] the present time, D] permission/non-permission data about reproduction/transfer of data for noncoincidence of region codes, and E] the period during which reproduction/transfer of data is permitted for noncoincidence of region codes.

The initial region code is set by the manufacturer of the data reproducing apparatus 2 in shipment.

An optimal value for the period in Item E] varies depending on the type of recorded data. The following guidelines illustrate several examples Data about movies and the like . . . about 1 month Data about personal computers and data about application software . . . half a year Data about basic OS such as Windows 3.1, 95, and 97 . . . about 2 years Data about accounting . . . 7 years As shown in FIG. 1, when the data reproducing apparatus 2 is used as an external recording apparatus of the host computer 3, the period is set to about half a year in accordance with the guidelines.

Figure 11:
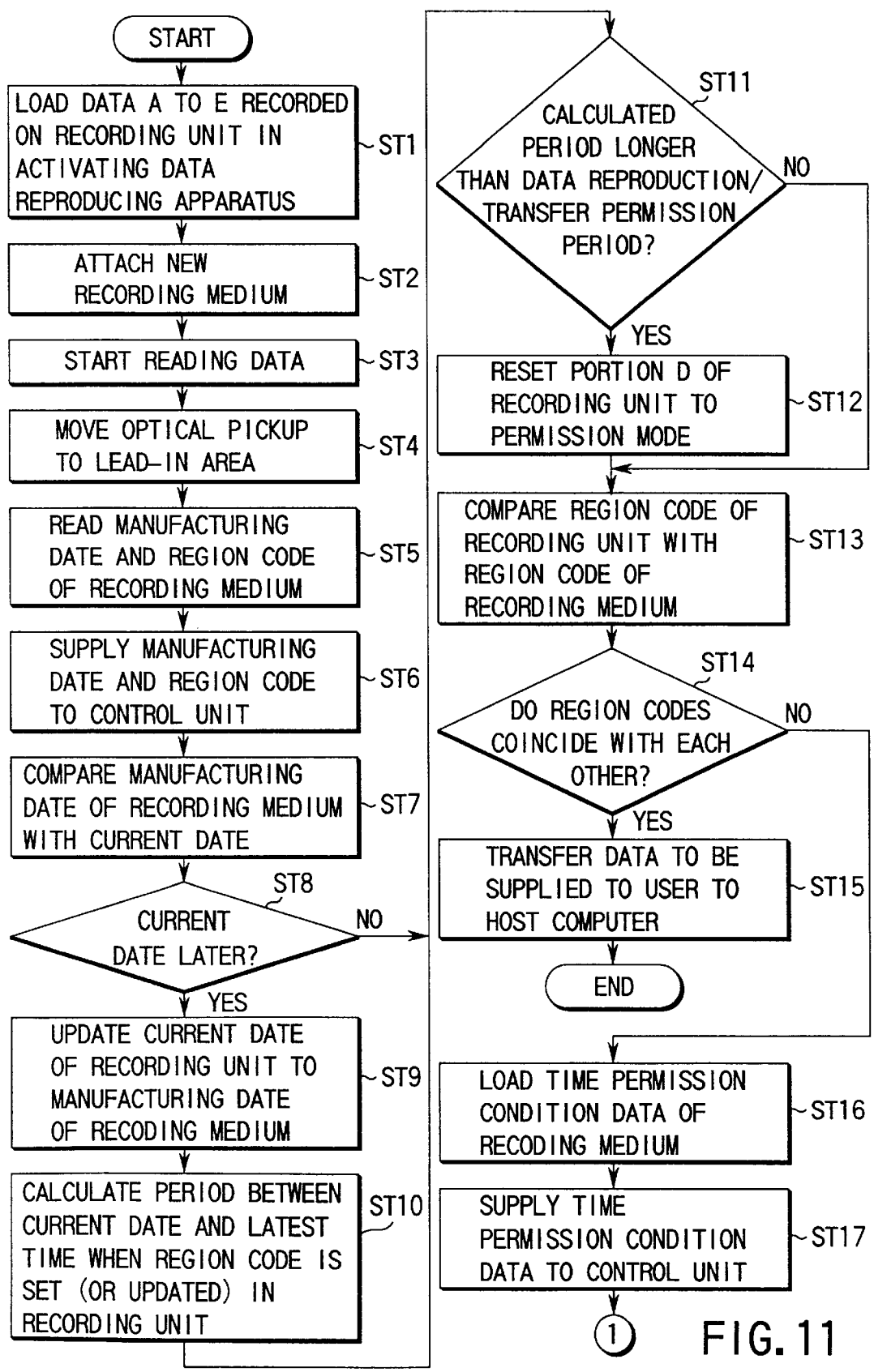
FIGS. 11, 12, 14, and 15 are flow charts, respectively, for explaining data reproduction.
Figure 12:
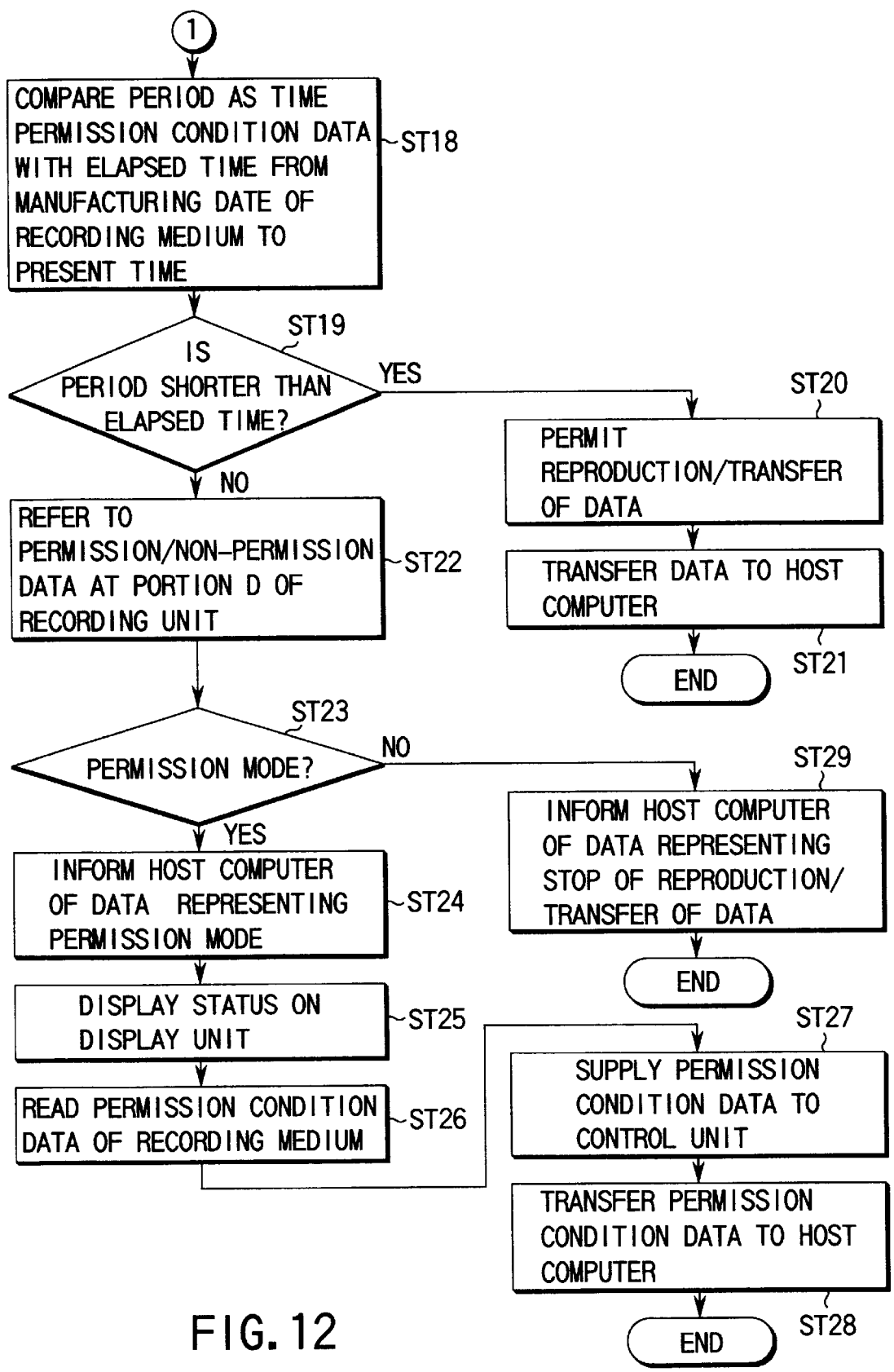

Data reproduction in this state will be explained with reference to flow charts shown in FIGS. 11 and 12.

In activating the data reproducing apparatus 2, the control unit 11 loads data A to E recorded on the recording unit 12 (ST1). A recording medium 1 is newly attached (ST2). When the data read unit 4 starts reading data (ST3), the optical pickup 51 moves to the control data portion 27 of the lead-in area 22 in FIG. 3 or the lead-in area 32 shown in FIG. 4 (ST4) to load the manufacturing date of the manufacturing date area 41 and the region code of the region code area 42 on the recording medium 1 (ST5).

The read manufacturing date and region code are supplied to the control unit 11 (ST6).

The control unit 11 compares the manufacturing date from the recording medium 1 with the current recorded on the recording unit 12 (ST7). As a result of this comparison, if the control unit 11 determines that the manufacturing date from the recording medium 1 is later than the current date recorded on the recording unit 12 (ST8), the control unit 11 updates the current date recorded on the recording unit 12 to the manufacturing date from the recording medium 1 (ST9).

Since the data reproducing apparatus 2 basically has no timer, the current date on the data reproducing apparatus 2 is updated to the manufacturing date of the latest recording medium 1 attached to the data reproducing apparatus 2.

If NO in step 8, the flow advances to step 10.

The control unit 11 calculates the period between the current date and the time when the region code is finally set (or updated) in the recording unit 12 (ST10). If the control unit 11 determines that the calculated period is longer than the period during which reproduction/transfer of data is permitted for noncoincidence of region codes (ST11), the control unit 11 resets the permission/non-permission data about reproduction/transfer of data for noncoincidence of region codes of the recording unit 12 to a permission mode (ST12).

If NO in step 11, the flow advances to step 13.

The control unit 11 compares the region code from the recording unit 12 with the region code from the recording medium 1 (ST13). As a result of this comparison, if the control unit 11 determines that the two region codes coincide with each other (ST14), the control unit 11 transfers to the host computer 3 via the data bus 5, data read by the data read unit 4 from the data area 33 where data to be supplied to the user is recorded, or the data area/rewritable data zone 23 (ST15).

If NO in step 14, the control unit 11 loads the time permission condition data 44 of the area 43 of the recording medium 1 by the optical pickup 51 (ST16).

The read time permission condition data 44 is supplied to the control unit 11 (ST17).

The control unit 11 determines the elapsed time from the read manufacturing data of the recording medium 1 to the present time from the recording unit 12, and compares the elapse time with compares time permission condition data from the recording medium 1 (ST18). As a result of this comparison, if the control unit 11 determines that the period is shorter than the elapsed time (ST19), the control unit 11 permits reproduction/transfer of data (ST20). The control unit 11 transfers to the host computer 3, data read by the optical pickup 51 from the data area 33 or the data area/rewritable data zone 23 (ST21).

If NO in step 19, the control unit 11 refers to permission/non-permission data about reproduction/transfer of data for noncoincidence of region codes of the recording unit 12 (ST22). If the permission mode is determined (ST23), the control unit 11 informs the host computer 3 via the host I/F control circuit 60 of data representing the permission mode (ST24).

The host computer 3 displays the status on the display unit 6 such as a CRT (ST25), and demands input of a password or ID code from the user.

The control unit 11 uses the optical pickup 51 to load the permission condition data 45 of the area 43 of the recording medium 1 (ST26).

The read permission condition data 45 is supplied to the control unit 11 (ST27).

The control unit 11 transfers the permission condition data to the host computer 3 (ST28).

As a result of the series of processes, if reproduction/transfer of data is not permitted in step 23 or the like, the control unit 11 stops reproduction/transfer of data, and informs the host computer 3 via the host I/F control circuit 60 of data representing the stop (ST29).

Instead of stopping reproduction/transfer of data, the control unit 11 may transfer a specific signal pattern to the host I/F control circuit 60, and may mix it in reproduction data to disturb the transfer of data.

As another embodiment wherein data services are provided even if region codes do not coincide with each other in the initial state, the following description is directed to the first embodiment wherein, when the region codes do not coincide with each other, the content of one of the region codes is changed in accordance with that of the other.

The first embodiment employs a method of determining region code change conditions in which the region code is changed using time data or data about data transfer control that is recorded on the recording unit 12.

In this case, as shown in FIG. 13, the recording unit 12 has

A] a region code added to the data reproducing apparatus 2 itself,

B] the latest time when the region code is updated in the recording unit 12,

C] the present time,

F] permission/non-permission data about update of the region code, and

G] the period during which re-update is permitted upon updating the region code.

In manufacturing the data reproducing apparatus 2, the manufacturer temporarily sets a region code corresponding to the place of manufacture. The manufacturer sets the time that corresponds to [B], to a past time much earlier than the actual time, and sets an environment wherein the region code can be automatically, easily reset during installation of the data reproducing apparatus 2 by the user.

The period during which re-update is permitted upon updating the region code" is set in advance by the manufacturer.

Figure 14:
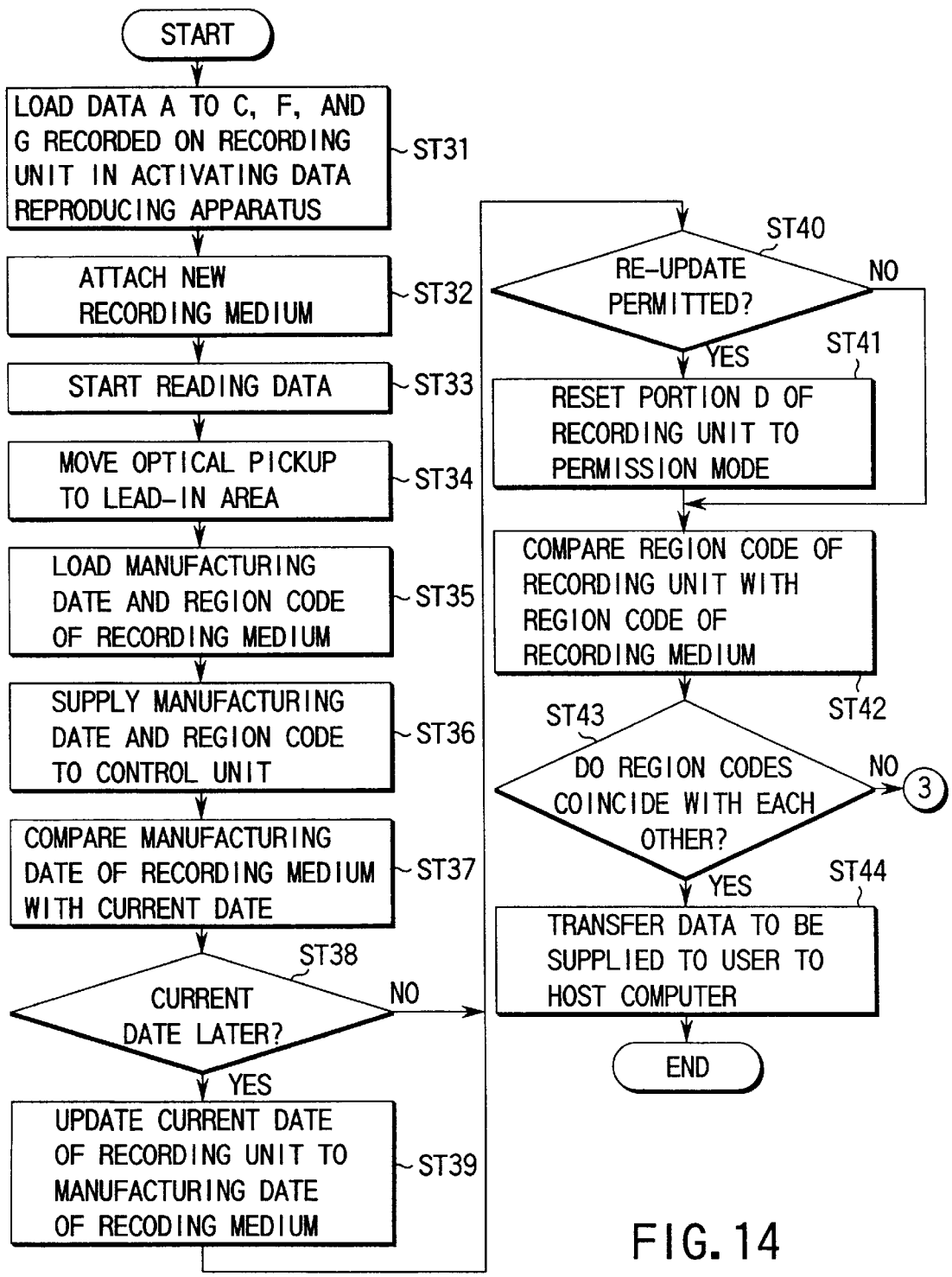
Figure 15:
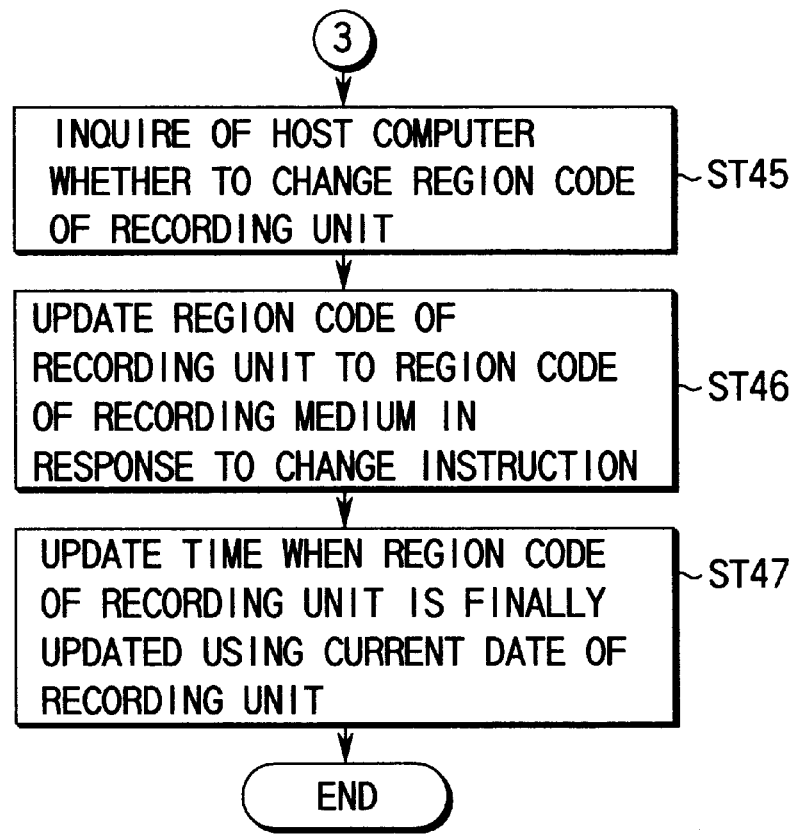

Data reproduction in this state will be explained with reference to flow charts shown in FIGS. 14 and 15.

In activating the data reproducing apparatus 2, the control unit 11 loads data A to C, F, and G recorded on the recording unit 12 (ST31). A recording medium 1 is newly attached (ST32). When the data read unit 4 starts reading data (ST33), the optical pickup 51 moves to the control data portion 27 of the lead-in area 22 in FIG. 3 or the lead-in area 32 shown in FIG. 4 (ST34) to load the manufacturing date of the manufacturing date area 41 and the region code of the region code area 42 of the recording medium 1 (ST35).

The read manufacturing date and region code are supplied to the control unit 11 (ST36).

The control unit 11 compares the manufacturing date from the recording medium 1 with the current date recorded on the recording unit 12 (ST37). As a result of this comparison, if the control unit 11 determines that the manufacturing date from the recording medium 1 is later than the current date recorded on the recording unit 12 (ST38), the control unit 11 updates the current date recorded on the recording unit 12 to the manufacturing date from the recording medium 1 (ST39).

Since the data reproducing apparatus 2 basically has no timer, the current date on the data reproducing apparatus 2 is updated to the manufacturing date of the latest recording medium 1 attached to the data reproducing apparatus 2.

If NO in step 38, the flow advances to step 40.

The control unit 11 checks whether re-update is permitted, on the basis of the current date, the latest time when the region code is updated in the recording unit 12, and the period during which re-update is permitted upon updating the region code (ST40). As a result of this determination, if re-update is determined, the control unit 11 resets the permission/non-permission data about update of the region code of the recording unit 12 to a permission mode (ST41).

If NO in step 40, the flow advances to step 42.

The control unit 11 compares the region code from the recording unit 12 with the region code from the recording medium 1 (ST42). As a result of this comparison, if the control unit 11 determines that the two region codes coincide with each other (ST43), the control unit 11 transfers, to the host computer 3 via the data bus 5, data read by the data read unit 4 from the data area 33 where data to be supplied to the user is recorded, or the data area/rewritable data zone 23 (ST44).

If NO in step 43, the control unit 11 inquires of the host computer 3 via the host I/F control circuit 60 whether to change the region code in the recording unit 12 (ST45).

If a change in region code is instructed in response to this inquiry, the control unit 11 updates the region code of the recording unit 12 to the region code from the recording medium 1 (ST46).

Immediately after updating the region code, the control unit 11 updates the latest time when the region code is updated in the recording unit 12 using the current date recorded on the recording unit 12 (ST47).

The method of determining region code change conditions is not limited to the above, and any method can be used as long as the region code is updated using time data or data about data transfer control that is recorded on the recording unit 12.

Figure 16:
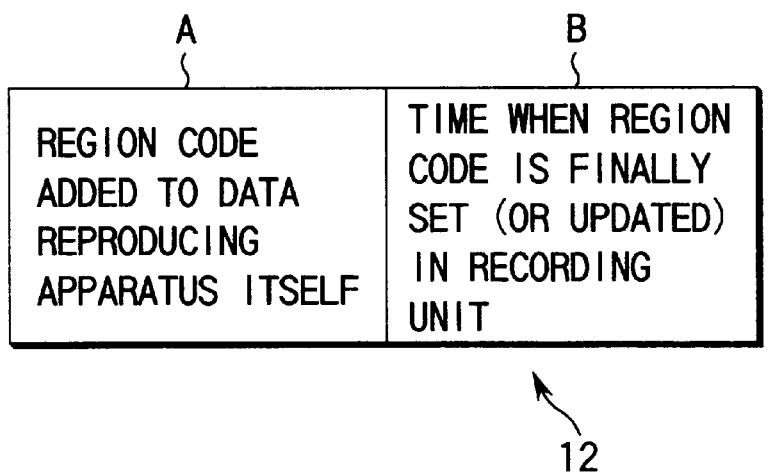

For example, as shown in FIG. 16, the recording unit 12 has only

A] a region code added to the data reproducing apparatus 2 itself, and

B] the latest time when the region code is updated in the recording unit 12.

When a recording medium 1 having a different region code is attached, the control unit 11 reads the manufacturing date of the area 41 of the recording medium 1.

The control unit 11 subtracts the latest region code update time of the recording unit 12 from the manufacturing date of the recording medium 1. When the obtained value is larger than a predetermined date (e.g., set at "+6 months"), the control unit 11 determines permission of a change in region code. In response to the determination of change permission, in updating the region code, the control unit 11 updates the latest time when the region code is updated in the recording unit 12 to the manufacturing date from the recording medium 1 used at this time.

The predetermined date to be compared with a value obtained by subtracting the latest region code update time of the recording unit 12 from the manufacturing date of the recording medium 1 is not limited to +6 months, and can be arbitrarily set to any one of values including 1 month or 7 years.

Figure 17:
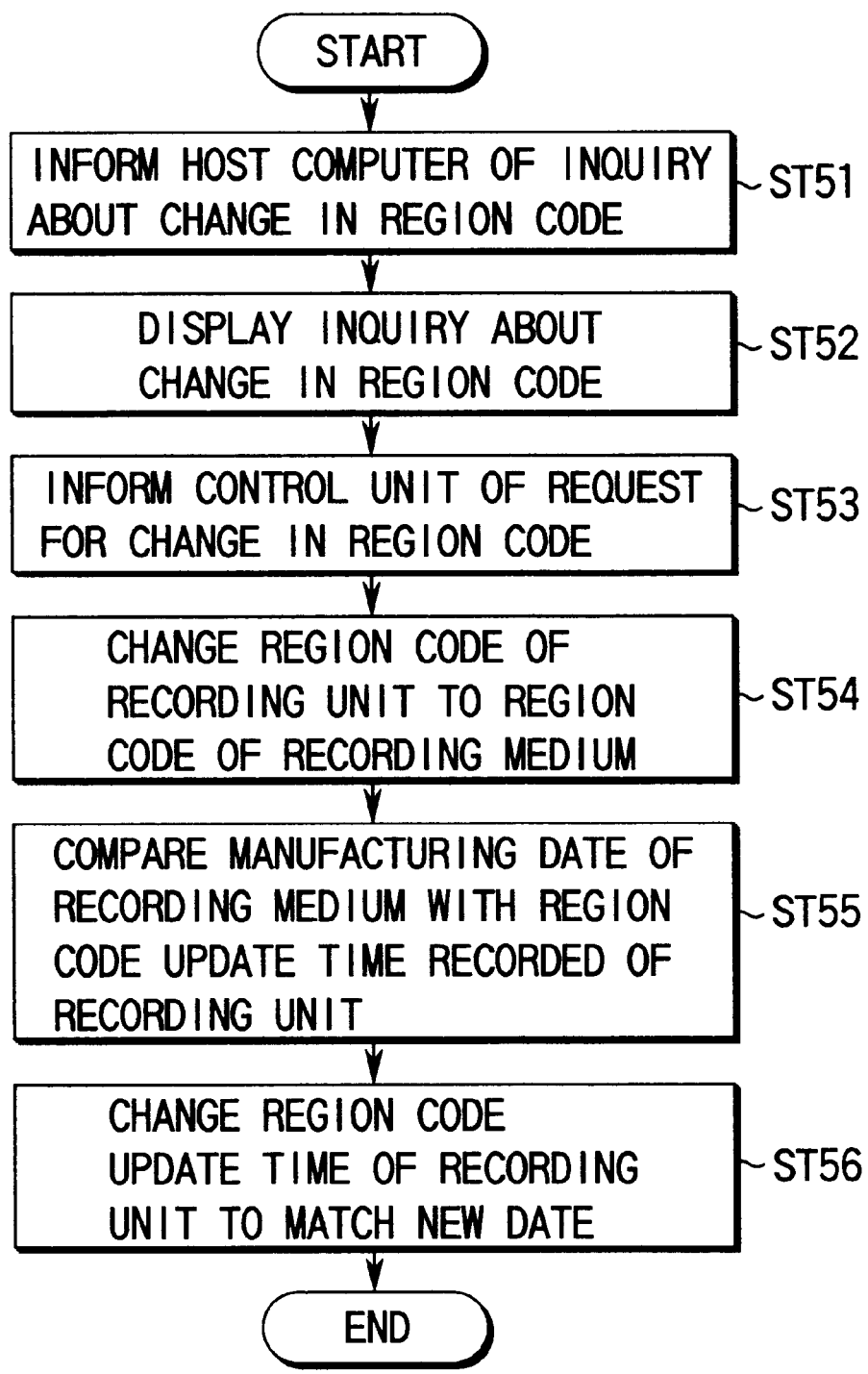
FIG. 17 is a flow chart for explaining a change in region code recorded on the recording unit 12, and a method of updating the region code update time.

A change in region code recorded on the recording unit 12 and a method of updating the region code update time will be described with reference to a flow chart shown in FIG. 17.

As described above, when the region code of the recording medium 1 does not coincide with the region code recorded on the recording unit 12, and update permission conditions for a change in region code and the region code update time are satisfied, the easiest update method can be 1. The control unit 11 of the data reproducing apparatus 2 informs the host computer 3 via the host I/F control circuit 60 of an inquiry about a change in region code (ST51).

2. The control unit 7 of the host computer 3 displays the supplied inquiry about the change in region code on the display unit 6 (ST52). This display asks the end user to verify whether to change the region code of the data reproducing apparatus 2.

3. When the end user instructs a request for a change in region code via a keyboard or the like (not shown), the control unit 7 of the host computer 3 informs the control unit 11 of the data reproducing apparatus 2 of the request for a change in region code (ST53).

4. Based on the request for a change in region code, the control unit 11 of the data reproducing apparatus 2 changes the region code recorded on the recording unit 12 to the region code of the recording medium 1 read by the data read unit 4 (ST54).

5. The control unit 11 of the data reproducing apparatus 2 compares the manufacturing date of the recording medium 1 read by the data read unit 4 with the region code update time recorded on the recording unit 12 (ST55), and changes the region code update time recorded on the recording unit 12 to the latest one (ST56).

When the current date is also recorded on the recording unit 12, the control unit 11 compares it with the manufacturing date of the recording medium 1 read by the data read unit 4. If the manufacturing date of the recording medium 1 is later, the current date is updated (not updated otherwise). The control unit 11 updates data in the recording unit 12 using the current date as the region code update time.

In this manner, the region code update time can be updated on the end user side.

However, if update of the region code of the data reproducing apparatus 2 is left to the end user, an ill-disposed end user may buy a plurality of data reproducing apparatuses 2 to set easily and illicitly the region codes of the data reproducing apparatuses 2 to different values, or all the values 1 to 6 of "RMA#m" in the format of the region code area 42 shown in FIG. 6 to "0", thereby enabling read/ transfer of all recording media 1 having different region codes.

To prevent this, the region code in the data reproducing apparatus 2 is desirably updated not by the end user but by the provider or dealer/update store.

A method of updating the region code by the provider or update store via a network will be described using a data reproducing system shown in FIG. 18.

In terms of the work efficiency, processing up to the determination of whether updating of the region code is permitted is executed on the data reproducing apparatus 2. The detailed processing up to determination is the same as the above-mentioned processing using FIGS. 1 and 2, and a description thereof will be omitted.

The region code is automatically updated by a server machine 80 at the provider or update store. The server machine 80 automatically, timely forms public and secret keys used in communication. The host computer 3 present on the user side to which knowledge of the public key is given on the network also forms public and secret keys.

Figure 18:
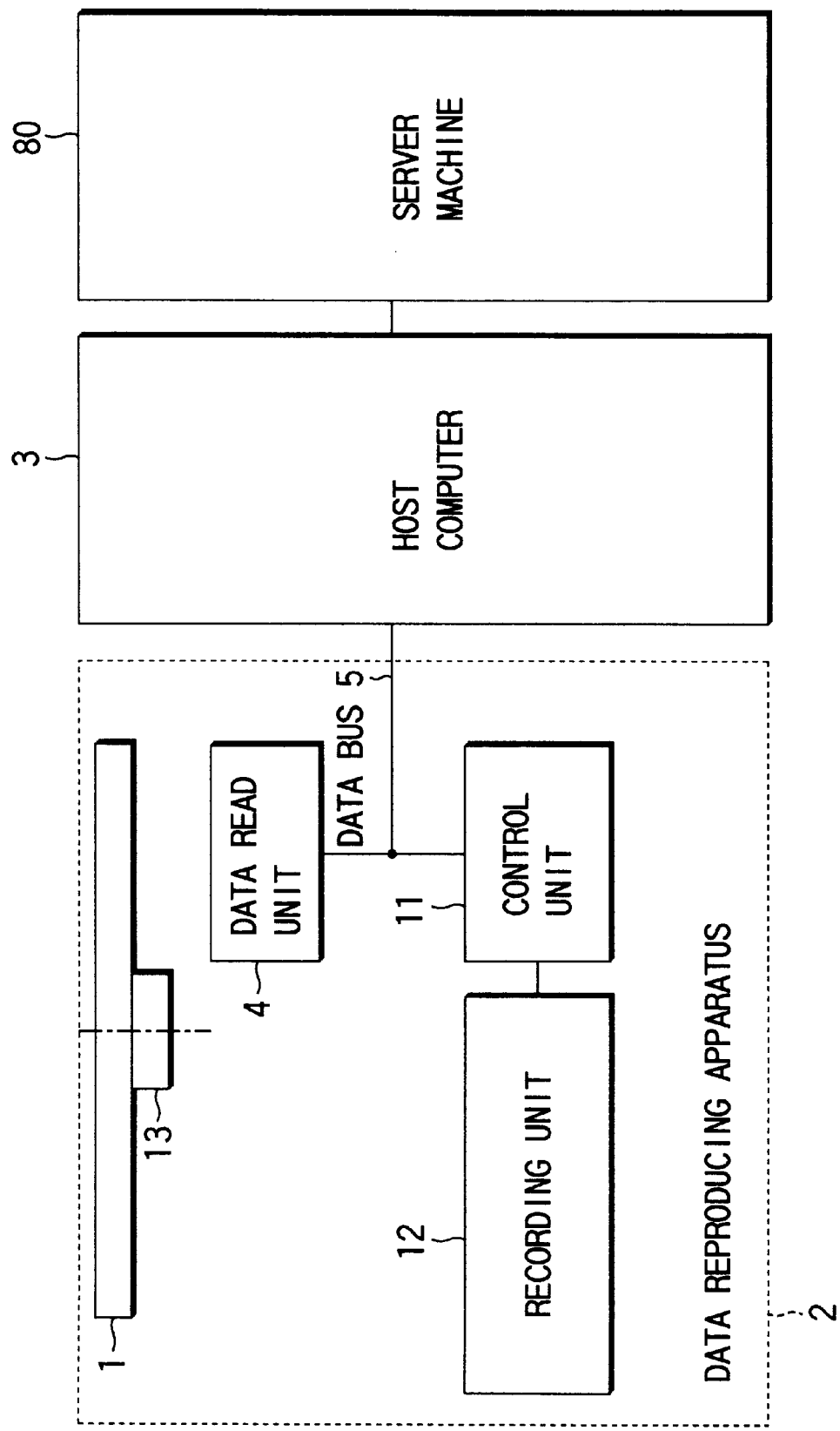
FIG. 18 is a block diagram for explaining the schematic configuration of the reproducing system connected to a provider via a network.
Figure 19:
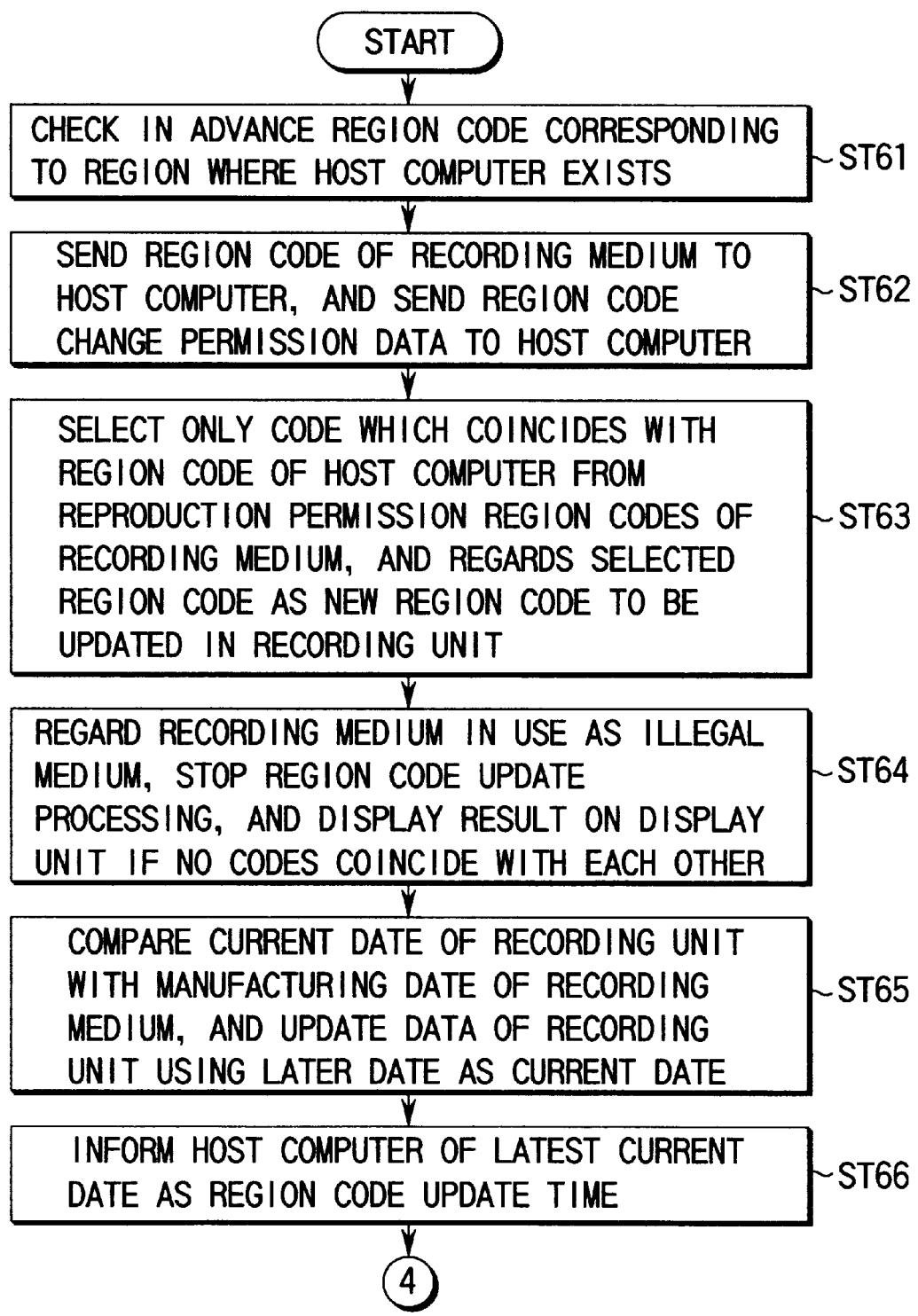
FIGS. 19 and 20 are flow charts, respectively, for explaining a method of updating the region code via the network on the provider or update store side.
Figure 20:
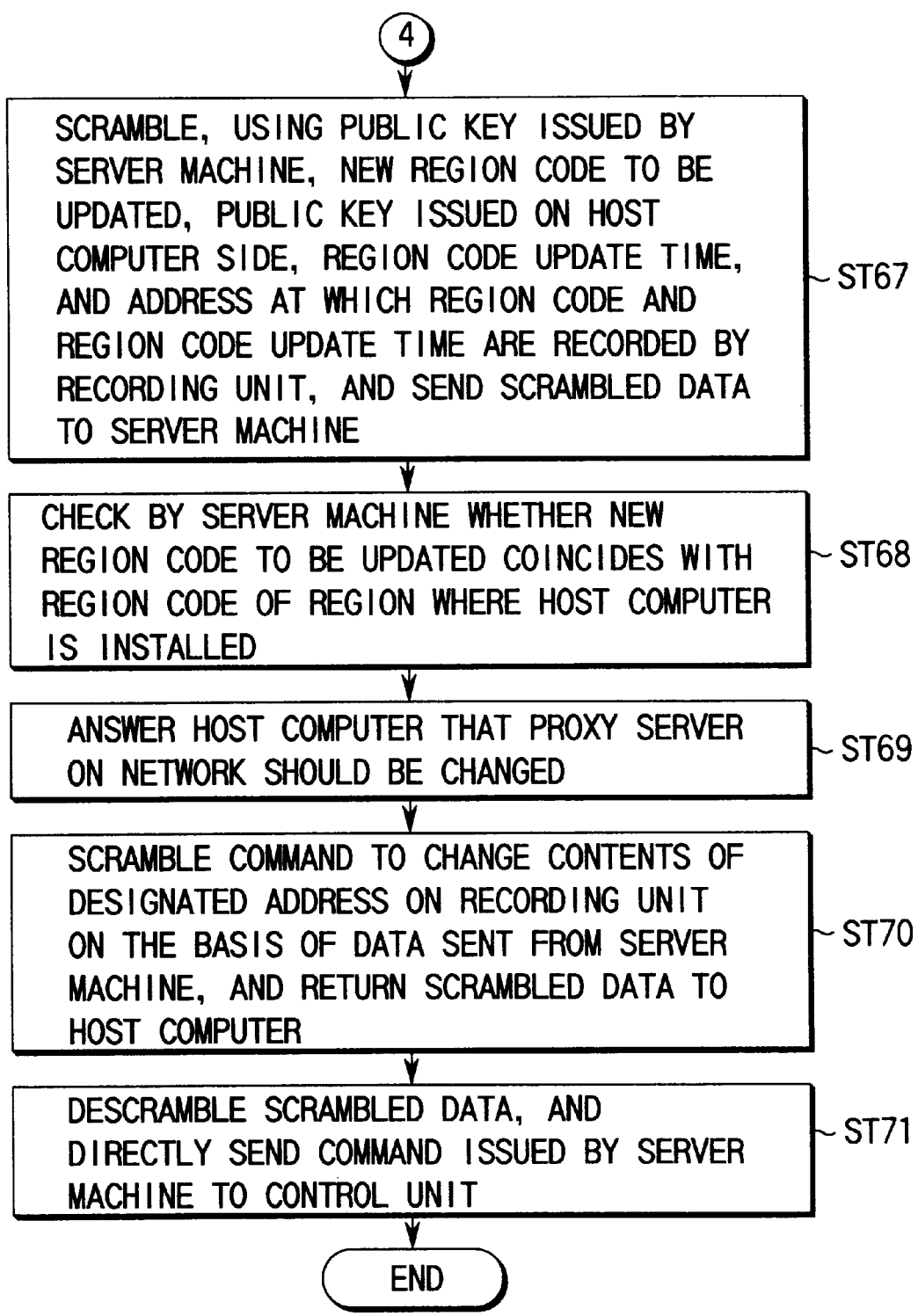

When the control unit 11 in FIG. 18 determines that update of the region code is permitted, the following processing shown in the flow charts of FIGS. 19 and 20 is performed.

1. The host computer 3 determines its present position on globe from the own IP address on the network, and checks in advance a region code corresponding to the region where the host computer 3 exists (ST61).

2. The data reproducing apparatus 2 sends the region code of the recording medium 1 read by the data read unit 4 from the control unit 11 to the host computer 3. At the same time, the data reproducing apparatus 2 also sends region code change permission data to the host computer 3 (ST62).

3. As is apparent from the region code recorded in the region code area 42 in FIG. 6, the recording medium 1 may have a plurality of reproduction-permitted region codes ("1" is set at a plurality of RMA#m). The host computer 3 selects only a code which agrees with the region code of the host computer 3 from among the reproduction-permitted region codes recorded on the recording medium 1 that are sent from the data reproducing apparatus 2, and regards the selected region code as a new one to be updated in the recording unit 12 (ST63).

If no reproduction-permitted region code recorded on the recording medium 1 coincides with the region code of the host computer 3, the host computer 3 regards the used recording medium 1 as an illicit medium, stops updating the region code, and displays the result on the display unit 6 (ST64).

4. The control unit 11 compares the current date recorded on the recording unit 12 with the manufacturing date recorded on the recording medium 1, and updates the data of the recording unit 12 using the later date as the current date (ST65).

5. The control unit 11 informs the host computer 3 of the latest current date as the region code update time (ST66).
6. The host computer 3 scrambles, with a public key issued by the server machine 80, the new region code to be updated, "a public key issued on the host computer 3, the region code update time, and addresses at which the region code and the region code update time in the recording unit 12 are recorded, and sends the scrambled data to the server machine 80 (ST67).
7. The server machine 80 descrambles the scrambled data sent with an own issued secret key, and compares the new region code to be updated on the server machine 80 side with the transmission IP address of the host computer 3 to check whether the new region code coincides with the region code of the region where the host computer 3 is installed (ST68). When the region codes do not coincide with each other, the server machine 80 replies the host computer 3 that the proxy server (not shown) on the network should be changed (ST69).
8. The contents of the recording unit 12 made up of an EEPROM and the like are changed using a vender-unique command not known to normal end users.

On the basis of data sent from the server machine 80, the control unit 11 scrambles a command for changing the contents at the designated address on the recording unit 12 by using a public key issued by the host computer 3 on the server machine 80, and returns the scrambled data to the host computer 3 (ST70).

9. The host computer 3 descrambles the scrambled data with a secret key issued by itself, and directly sends, to the control unit 11, a command issued by the server machine 80 (ST71).

Update of the region code using the network has been described above. As another embodiment, a method of directly bringing the data reproducing apparatus 2 to the provider, dealer, or update store, instead of using the network, and updating the region code will be explained.

The provider, dealer, or update store has an update-only host computer 3 and server machine 80, and connects them to a data reproducing apparatus 2 brought in via an interface such as SCSI, IDE, or RS232C. The subsequent update method has entirely the same processing as that of the method using the network.

As still another embodiment wherein data services are provided even if region codes do not coincide with each other in the initial state, the following description concerns the second embodiment wherein, when region codes do not coincide with each other, the content of one of the region codes is changed in accordance with that of the other.

In the second embodiment, a plurality of recording media 1 are used for the data reproducing apparatus 2. The region code regarding region data recorded on the recording unit 12 is updated in accordance with a region code having the highest total value of the region code numbers of the respective recording media 1.

In the first embodiment, the region code is temporarily added at the fabrication place (manufacturer) of the data reproducing apparatus 2 in shipment. In the second embodiment, it is also possible not to set any region code in shipment and to set a region code only after using a plurality of recording media 1.

In this case, the data reproducing apparatus 2 permits reproduction of data from the recording media 1 having various region codes before setting the region code.

The data reproducing apparatus 2 in the second embodiment has a location for recording the history of the region code of the recording medium 1 having been used.

As the location for recording the history of the region code, the recording unit 12 made up of an EEPROM and the like in FIG. 1 is used to record the history of the region code at an address different from a location where the region code and the region code update time recognized by the recording medium 1 are recorded.

The present invention is not limited to the above embodiments. In addition to the recording unit 12, a semiconductor memory such as EEPROM can be separately arranged as the third recording unit (not shown in FIG. 1), and the region code of each past recording medium 1 and the manufacturing date of the recording medium 1 can be recorded on the third recording unit.

The history content of the region code of each recording medium 1 recorded on the recording unit 12 will be explained with reference to FIGS. 21 and 22.

In FIG. 21, the rows in the lateral direction correspond to individual recording media 1. When the user gets a data reproducing apparatus 2, the manufacturing date of the first recording medium 1 used by the user is "Nov. 1, 1996", and reproduction is permitted for regions "1" and "2", the data is recorded on row "No. 1" in the recording unit 12, and "1" is recorded on the use flag column of the recording medium 1, as shown in FIG. 21.

Every time the data reproducing apparatus 2 uses a new recording medium 1, a new row is added. In this application, no region code is set in manufacturing the data reproducing apparatus 2, and a region code is automatically set only after using 11 recording media 1.

When only five recording media 1 have been used, as in FIG. 21, the user can reproduce data from a recording medium 1 having any region code without limitation on data transfer. At this time, every time the recording medium 1 is attached to the data reproducing apparatus 2, the display unit 6 displays "Please use a disk used in your region though you can reproduce up to 11 disks of any regions as free service after buying this optical disk device (data reproducing apparatus 2). You can use only disks sold in your region from the 12th disk."

The user uses the 11th disk, then all the columns are filled as shown in FIG. 22. At the start of every use of the recording medium 1, the control unit 11 of the recording unit 12 reads the total value (sum value) of the use flag of the recording medium 1. When this total value reaches "11", the following processing is performed to start checking the region code of a recording medium 1 from the 12th one.

(1) The total values (sum values) of the respective region codes are read. A region code value having the highest region code appearance frequency (maximum total value) is automatically set or updated (recorded at another address in the recording unit 12) as the region code of the data reproducing apparatus 2.

(2) If a plurality of region codes have the maximum total value, one region code is set in accordance with sequences:
  (a) the region code of a recording medium 1 closer to the last (11th) one has priority, and
  (b) the region code of a recording medium 1 having the oldest manufacturing date has priority.

(3) The latest date of the manufacturing dates of the recording media 1 is automatically set (recorded at another address in the recording unit 12) as the setting (or update) time of the region code.

The embodiments of the present invention are not limited to the above method. For example, the latest date of the manufacturing dates of the recording media 1 can be set as the present time of the data reproducing apparatus 2. Of the manufacturing dates of the recording media 1, the oldest one can be set as the setting time of the region code.

As described above, when a region code is not set at the fabrication place (manufacturer) of the data reproducing apparatus 2 in shipment, but is set only after using a plurality of recording media 1, the region code of the data reproducing apparatus 2 is set only upon using 11 recording media 1.

When the region code is temporarily added in shipment, the content of the temporarily added region code is updated after using 11 recording media 1. In this case, even if the region code temporarily set in the data reproducing apparatus 2 does not coincide with the region code of the recording medium 1 for the first 11 recording media 1 used, reproduction/transfer of data is permitted. Upon updating the region code, if the region code recorded on the data reproducing apparatus 2 does not coincide with the region code of 12th or subsequent recording medium 1, reproduction/transfer of data is inhibited.

In this application, the number of recording media 1 used before setting the region code desirably ranges from 3 to 100. This is because a plurality of region codes are often registered in one recording medium 1, as is apparent from FIG. 21. For example, region codes "1" and "2" are registered in the first recording medium 1 in FIG. 21.

To set (update) the region code of the data reproducing apparatus 2 in accordance with this application, one type of value cannot be set (or updated) as the region code of the data reproducing apparatus 2 from one recording medium 1. Therefore, a plurality of (at least three) recording media 1 are required.

It is undesirable to permit noncoincidence of region codes over a long time after the user bought the data reproducing apparatus 2. That is, it is undesirable to permit reproduction of the recording medium 1 or transfer of reproduction data in an unusable region.

For example, assuming that the user uses three recording media 1 everyday, the user will use about 90 recording media 1 in 1 month (about 30 days). After one month of permitting non-coincidence of region codes, the region code of the data reproducing apparatus 2 is preferably set (or updated) after using 100 recording media 1.

It is most preferable to set (or update) the region code before/after 11 or five recording media 1 as an intermediate value on a log scale from three recording media 1 to 100 recording media 1.

Eleven or five recording media 1 may be shipped together with the data reproducing apparatus 2 upon being packed in a sealed state. Alternatively, they may be commercially available media.

Basically, the region code of the data reproducing apparatus 2 is not updated after setting (or updating) the region code upon the use of 11 or five recording media 1. However, when the update permission conditions for the region code update time as described above are satisfied, the region code can be further updated.

A processing method in this case will be explained below.

The method of recording the history of the region codes of only the first 11 recording media 1 after the user bought the data reproducing apparatus 2 has been described. When the user has used the 12th or subsequent recording media 1, region code data of all recording media 1, including a recording medium 1 inhibited from reproducing or transferring data due to noncoincidence of region codes, are recorded on row "No. 11" in FIG. 22. At the same time, old data are shifted upward in units of rows.

Each time, the difference between the manufacturing date of the recording medium 1 recorded on row "No. 11" and the latest region code update time is calculated. When the calculated value is larger than a predetermined date (set at, e.g., "+6 months"), the control unit 11 permits a change in region code. In updating the region code, the manufacturing date of the recording medium 1 recorded on row "No. 11" is directly used as the latest time when the region code is updated in the recording unit 12.

The region code of the data reproducing apparatus 2 to use 11 or five recording media 1 and further, to use between three and 100 recording media 1. The number of recording media 1 is not limited to this, but is preferably an odd number for the reason to be described below. So long as this condition is satisfied, the number of recording media 1 may fall outside the range of 3 to 100.

More specifically, data of each recording medium 1 recorded on the recording unit 12 as shown in FIG. 22 is registered whenever a recording medium 1 is newly mounted on the data reproducing apparatus 2. Even if the user has only two recording media 1, and alternately uses them, the data of the used recording media 1 are sequentially registered in the recording unit 12.

For example, the region code of the data reproducing apparatus 2 is set using the region codes of an even number of recording media 1. In this case, referring to an example in FIG. 23, the number of recording media 1 having "region code 3" is 5, and that of recording media 1 having "region code 6" is 5. As described above, if a plurality of region codes have the maximum total value, and if a plurality of region codes have the maximum total value, one region code is set in accordance with sequences:
  (a) the region code of a recording medium 1 closer to the last (10th) one has priority, and
  (b) the region code of a recording medium 1 having the oldest manufacturing date has priority.

Following these sequences, the region code of the data reproducing apparatus 2 can be set at "6".

However, to avoid generation of a plurality of region codes having the maximum total value, it is desirable to set the number of recording media 1 used to set the region code of the data reproducing apparatus 2 to an odd number.

In contrast to the method using an even number of (e.g., 10) recording media 1, as shown in FIG. 23, an odd number of (e.g., 11) recording media 1 are used, as shown in FIG. 24. In the example of FIG. 24, the number of used recording media 1 having "region code 3" is 6, and that of used recording media 1 having "region code 6" is 5. In this manner, generation of a plurality of region codes having the maximum total value hardly occurs.

If a tie-break occurs in deciding the region code by majority rule using the region codes of the 11 recording media 1, the region code is determined using one more recording medium 1.

Figure 25:
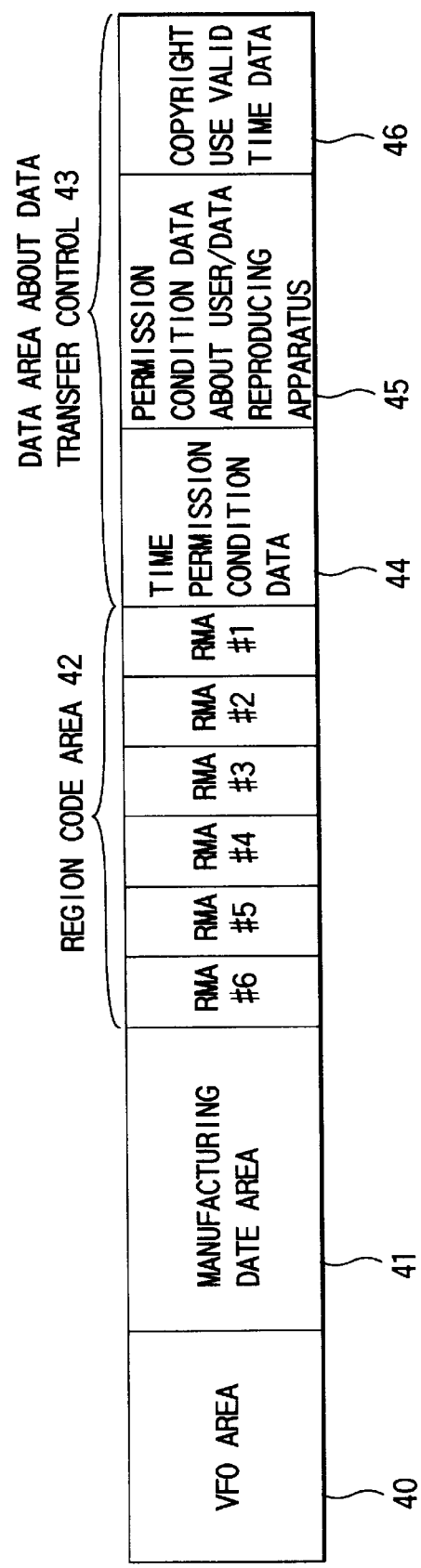
FIG. 25 is a view showing the detailed contents of part of data recorded in the lead-in area on the recording medium.

As shown in FIG. 25, copyright use valid time data 46 may be recorded in the area 43 where data about data transfer control is recorded that has been explained with reference to FIG. 6. By setting the valid time of copyright use, i.e., setting the data reproduction limit, the period of copyright use can be limited to set (contract) the royalty for copyright at low cost. The copyright use valid time data 46 may indicate the validity limit to a certain date or the valid period from a given date to a certain date.

In this case, the data reproducing apparatus transfers data read from the data area 33 or data area/rewritable data zone 23 of a corresponding recording medium 1 to the host computer 3 via the data bus 5 by using the copyright use valid time data 46.

More specifically, the data reproducing apparatus 2 compares the current date recorded on the recording unit 12 with the copyright use valid time data 46 read from the area 43 of the recording medium 1 where data about data transfer control is recorded. As a result of this comparison, when the current date exceeds the valid time of copyright use (or falls outside the validity period), the data reproducing apparatus 2 does not transfer any data. Furthermore, as a result of the comparison, if the current date does not exceed the valid time of copyright use (or falls within the valid time), the data reproducing apparatus 2 transfers data.

The above-described embodiments have exemplified the data reproducing system constituted by the data reproducing apparatus 2 and the host computer 3. The present invention is not limited to this, and the same processing can also be executed in a data reproducing system in the network field wherein data is transferred using a network such as the Internet, and the transferred data is displayed on a CRT screen or printed on paper.

The network such as the Internet includes both a wire network and a wireless network using a radio wave, light, and the like.

Figure 26:
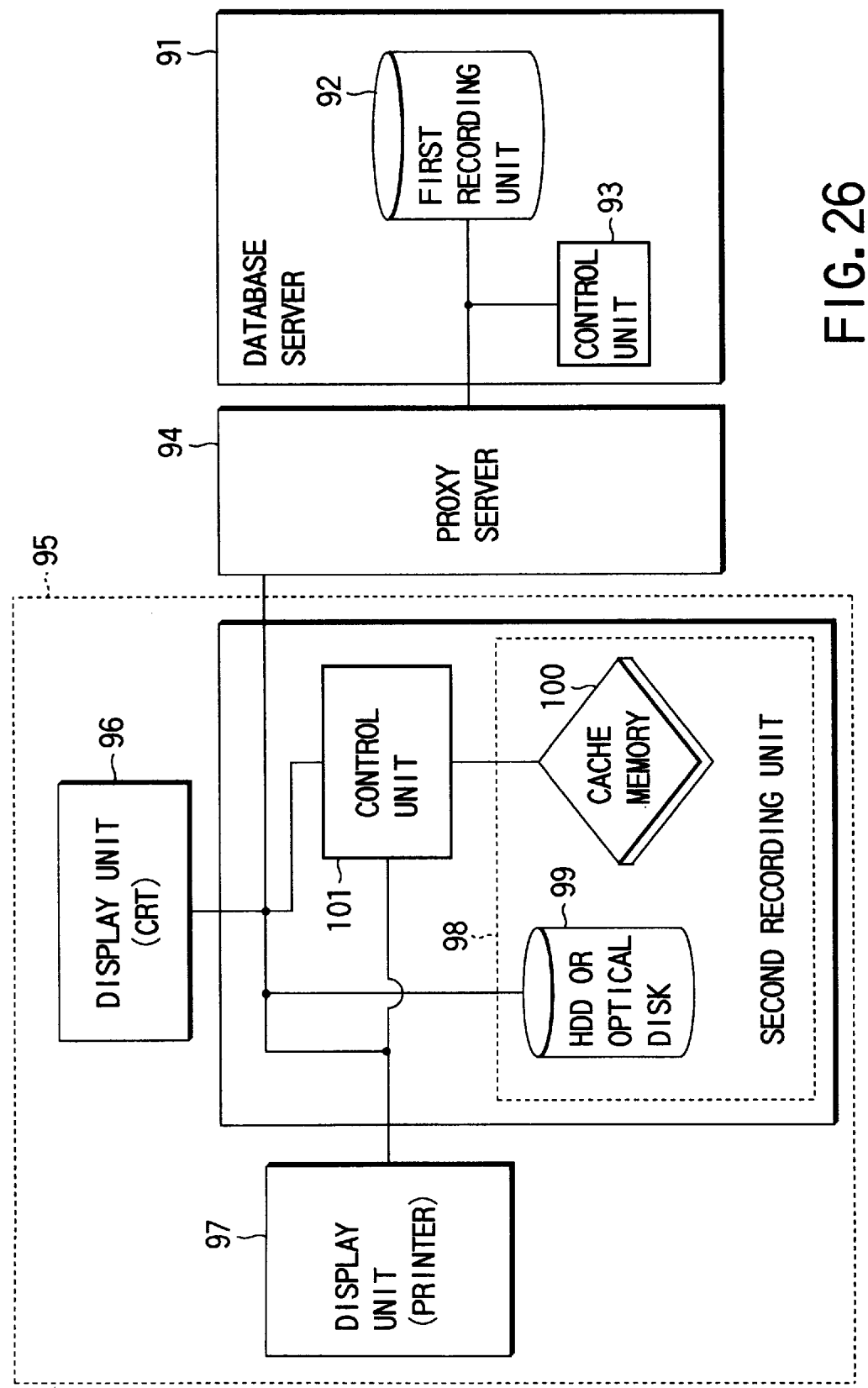
FIG. 26 is a block diagram for explaining the schematic arrangement of a data reproducing system applied to the network field.

The data reproducing system in the network field will be described with reference to FIG. 26.

A method of recording determination data for determining permission of data services in advance in addition to the region code, and permitting data services using this data will be explained.

More specifically, the data supply side in the data providing service on the network is a database server 91. Data to be provided is stored in a first recording unit 92 made up of an HDD or an optical disk. A region code designating a providable region is added as the first data in units of data to be provided. When this region code does not coincide with the region code of the data reception side as the second data, a control unit 93 for controlling data transfer operates to stop data transfer. Instead, an error message is transmitted to the client side. The error message having a content "we cannot provide data because of noncoincidence of region codes" is transferred.

As another example, instead of stopping data transfer, the control unit 93 adds noise data to a transfer signal in transferring data, thereby changing the contents of the transferred data. In this case, the provided image is disturbed.

In the first recording unit 92, the formation date of data is set as data associated with time data serving as the third data in units of data provided to the client side.

In the first recording unit 92, transfer permission condition data is further recorded in units of data.

The database server 91 incorporates a timer (not shown). In general, data transfer is stopped in the case of noncoincidence of region codes as a data transfer control condition. However, the data transfer condition can be changed based on the third data.

That is, the control unit 93 reads the current date from the timer incorporated in the database server 91, and reads the data formation date from the first recording unit 92 to compare them. If a specific time has elapsed upon forming the data (permission conditions are satisfied), the control unit 93 permits data transfer. The elapsed time for permission is set to 1 month to 7 years depending on the type of data.

For example, the permission period of data about movies and the like is set to 1 month because a short difference in the release time of a movie between regions is about 1 month. The permission period of data about a matter having a short generation alternation period is set to half a year because the generation alternation or version-up period of the personal computer or application software is about half a year.

As is apparent from the periods of Windows 3.1, 95, and 97, the basic OS changes at a period of about 2 years. Therefore, the permission period of data about this is set to 2 years as a guideline. In Japan, the past account books must be kept on record for 7 years according to the tax law. For this reason, the permission period of data about accounting and the like is set to 7 years.

As another application, the user name and the organization name to which the user belongs are sent as data about data transfer control from the client side together with a data supply request. Even if region codes do not coincide with each other, data transfer control conditions can be changed for only a specific user to transfer data.

A method of, when region codes do not coincide with each other, changing the content of one region code in accordance with that of the other will be explained below.

More specifically, for the client side, the data reception side, is a PC or EWS 95 connected via a proxy server 94. The region code being the first data to be supplied, is recorded on the first recording unit 92 of the database server 91 in advance.

The client side has a display unit (output means) 96 such as a CRT for displaying data by software, and a display unit (output means) 97 such as a printer for displaying data by hardware. Further, the client side has, as a second recording unit 98, a memory 99 such as a HDD or optical disk capable of large-capacity recording, and a cache memory 100 such as a RAM or an EEPROM. The client side may have a speaker (output means; not shown) for producing a sound, in place of the display units 96 and 97.

The PC or EWS 95 on each client side has a control unit 101 mainly constituted by one or a plurality of high-speed CPUs.

In requesting data supply service from the database server 91, the PC or EWS 95 scrambles, using a public key known to the database server 91, data such as requested data contents, a region code designating the place where the PC or EWS 95 on the client side is installed (data is recorded in the second recording unit 98 in advance), the user name (including the user's organization name), the user ID number, and of public and secret keys formed on the user side, public key data knowledge of which can be given to the database server 91. The PC or EWS 95 sends the scrambled data to the database server 91.

Generally, when region codes coincide with each other, the control unit 93 confirms the IP address of the PC or EWS 95 on the client side contained in the packet of a communication protocol upon reception of a data supply request. After determining the authenticity of the region code, the control unit 93 permits data transfer. In response to this permission, desired data is scrambled with a public key issued by the PC or EWS 95 on the client side, and then sent to the PC or EWS 95.

The control unit 101 of the PC or EWS 95 descrambles the sent data with a secret key formed in advance, and directly displays the descrambled data on the display unit 96 or 97. Application software or data requiring reprocessing is directly stored in the second recording unit 98 upon descrambling the data with the secret key, instead of being displayed on the display unit 96 or 97.

For example, when the PC or EWS 95 on the client side having been used in Japan, is moved to the United States, the region code recorded on the second recording unit 98 must be changed.

More specifically, the region code stored in the second recording unit 98 must be changed in accordance with the region code stored in the first recording unit 92 in correspondence with data being requested.

If the user can frequently update the region code, undesirable results may occur, for example, the user in Japan can easily and illicitly change the region code to that of the United States in accordance with the data wanted.

The control unit 101 is therefore programmed not to frequently update the region code. For this purpose, the region code update time is recorded on the second recording unit 98, and compared with the timer of the PC or EWS 95 on the client side. If a specific period such as 1 month to 7 years elapses after updating the region code, the region code can be changed.

As still another embodiment, region code change permission/non-permission data can be recorded on the second recording unit 98. Only when a specific password of a specific user is authenticated, is region code permission data" is given in advance. In accordance with this permission status, the control unit 101 updates the region code in the second recording unit 98.

As still another embodiment, the database server 91 changes the region code recorded on the cache memory 100 of the second recording unit 98.

When the user desires a change in region code, the following are scrambled with a public key issued by the database server 91 in advance: a desired region code number upon update, a public key code issued on the client PC or EWS side, and the latest region code update time, or data satisfying update permission conditions such as the user name, the user organization name, or the password unique to the user. Then, the PC or EWS 95 sends the request to the database server 91.

In this case, the public key issued by the database server 91 can be read by a third person, and issued upon registering the public key at an authentication office via a network corresponding to the database server.

The database server 91 descrambles data with a secret key issued by itself, and verifies the desired region code upon update with the IP address of the transmission source.

If the proxy server 94 and the PC or EWS 95 on the client side are distant from each other, and the verify results do not indicate coincidence, the database server 91 notifies the user to please send a request again after changing the proxy server 94 to the nearer one as a communication path". When region code change permission conditions are satisfied, the database server 91 scrambles a vendor-unique command to change the contents of the cache memory 100 with a public key, and sends the scrambled command to the client side. The control unit 101 on the client side descrambles the command using secret key issued by itself, scrambles the command, and sends back the command to the client side. The control unit 101 on the client side sends the command to the cache memory 100.

The first recording unit 92 corresponds to the recording medium 1 shown in FIG. 1. The first data corresponds to the region code of the region code area 42 in FIG. 6. The second data corresponds to the region code of the recording unit 12 added to the data reproducing apparatus 2 itself shown in FIGS. 10 and 13. The third data corresponds to the time data determined from the manufacturing date of the manufacturing date area 41 and the time permission condition data 44 of the area 43 in FIG. 6, or the permission condition data 45 of the area 43.

As described above, the region code and the manufacturing date are recorded on the recording medium in the form of microstructures. For this reason, data can be very stably recorded without degrading recorded data owing to deterioration in recording film or the like.

Since data have different reproduction signal waveforms used in recording them on a DVD-R or DVD-RAM, recorded data forged by the end user using the DVD-R or DVD-RAM can be easily eliminated.

As a result, data having high reliability can be obtained in terms of the use environment.

In the data reproducing apparatus, remedy upon noncoincidence of region codes can be performed by either one of very simple methods:

(1) reproduction/transfer of data is enabled using data other than the region code even when region codes do not coincide with each other, and (2) either one of the region codes is changed when the region codes do not coincide with each other.

The region code in the recording unit incorporated in the data reproducing apparatus cannot be updated for a predetermined period upon update. Therefore, the end user cannot illicitly reproduce data by changing the region code in accordance with the region code of each recording medium.

Since a read-only signal is differentiated from a write-once signal using the reproduction signal waveform, recording forged by the end user can be easily eliminated to perform processing with very high reliability as for the region code.

The data reproducing apparatus has conventionally incorporated a nonvolatile memory such as an EEPROM as a data storage location for the sequential program of the data reproducing apparatus. By recording the region code, the region code update time, and the like on the nonvolatile memory, the region code can be managed with high reliability without changing the hardware structure of the conventional data reproducing apparatus, i.e., increasing its cost.

Since a command to change the contents of the nonvolatile memory such as an EEPROM is a vendor-unique command which normal end users do not know, the end user cannot easily and illicitly change the region code.

As the data reproducing system, remedy upon noncoincidence of region codes can be performed by either one of the very simple methods:

(1) reproduction/transfer of data is enabled using data other than the region code even when region codes do not coincide with each other, and (2) either one of the region codes is changed when the region codes do not coincide with each other.

The region code cannot be updated for a predetermined period upon updating the region code of one of the two recording units. Accordingly, the end user cannot illicitly gather data from all the regions of the world having different region codes by frequently changing the region code recorded on the recording unit nearer the end user.

The region code of the region where the host computer is installed is determined from the IP address, and compared with the region code recorded on a recording medium. This can prevent an illicit change in region code of the data reproducing apparatus using an illicit recording medium used outside a corresponding region.

The contents of the recording medium can be output by monitoring the time based on the region code. When the latest recording medium is loaded, the timer monitoring the time can be updated by the manufacturing date from the recording medium.

In this manner, no hardware need be added, and no battery for managing the timer is required.

The reproduction period of the contents of the recording medium can be limited to, e.g., 2 years from the start of the use. A low royalty for copyright can be contracted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A reproduction apparatus for reproducing data from a recording medium that comprises reproduction data to be reproduced and a medium region code used for managing whether or not reproduction of the reproduction data is allowed in each of a plurality of regions, said reproduction apparatus comprising:

recording means for recording an apparatus region code that is used for management in a region where the reproduction apparatus is used;

first reproducing means for reproducing a medium region code from the recording medium;

first determination means for determining whether the medium region code reproduced by the first reproducing means coincides with the apparatus region code recorded by the recording means;

second reproducing means for reproducing the reproduction data from the recording medium when the first determination means determines that the medium region code coincides with the apparatus region code;

second determination means for determining whether or not the apparatus region code recorded by the recording means is allowed to be updated; and updating means for replacing the apparatus region code recorded by the recording means with the medium region code reproduced by the first reproducing means if the second determination means determines the apparatus region code may be updated, said updating means updating the apparatus region code by reproducing a medium region code from at least one recording medium and by checking which medium region code is largest in number.

* * * * *